(12) United States Patent
Nishioka et al.

(10) Patent No.: US 11,761,718 B2
(45) Date of Patent: Sep. 19, 2023

(54) SHEET FOR HEAT EXCHANGE

(71) Applicant: Toray Industries, Inc., Tokyo (JP)

(72) Inventors: Kazuya Nishioka, Otsu (JP); Hiroki Takeda, Otsu (JP); Tomoko Takano, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 659 days.

(21) Appl. No.: 16/769,069

(22) PCT Filed: Nov. 29, 2018

(86) PCT No.: PCT/JP2018/043938
§ 371 (c)(1),
(2) Date: Jun. 2, 2020

(87) PCT Pub. No.: WO2019/111793
PCT Pub. Date: Jun. 13, 2019

(65) Prior Publication Data
US 2021/0164737 A1    Jun. 3, 2021

(30) Foreign Application Priority Data

Dec. 5, 2017 (JP) ................................. 2017-233151
Feb. 28, 2018 (JP) ................................. 2018-034872

(51) Int. Cl.
*F28F 13/00* (2006.01)
*C09D 133/08* (2006.01)
(Continued)

(52) U.S. Cl.
CPC .............. *F28F 13/003* (2013.01); *B32B 5/18* (2013.01); *B32B 27/065* (2013.01); *B32B 27/30* (2013.01);
(Continued)

(58) Field of Classification Search
CPC ....... Y10T 428/31504; Y10T 428/1307; Y10T 428/1376; Y10T 428/31511;
(Continued)

(56) References Cited

U.S. PATENT DOCUMENTS 8,383,526 B2    2/2013 Miyagoshi et al.
2002/0018898 A1*  2/2002 Opolski ............... C09D 201/02
                                                                428/34.3
(Continued)

FOREIGN PATENT DOCUMENTS

JP          6059178 A    4/1985
JP        200814623 A    1/2008
(Continued)

OTHER PUBLICATIONS

International Search Report and Written Opinion for International Application No. PCT/JP2018/043938, dated Jan. 15, 2019, 7 pages.

*Primary Examiner* — Hai Vo
(74) *Attorney, Agent, or Firm* — RATNERPRESTIA

(57) ABSTRACT

The present invention addresses the problem of providing a sheet for heat exchange elements, which has high water resistance, while also having excellent productivity by achieving excellent shape stability. The present invention is a sheet for heat exchange elements, which is provided with a laminate that is composed of at least a porous substrate and a resin layer, and which is configured such that the resin layer contains at least a urethane resin and a polyvinylpyrrolidone and/or a vinylpyrrolidone copolymer.

7 Claims, 3 Drawing Sheets

(51) Int. Cl.
  *C09D 139/06* (2006.01)
  *C09D 175/04* (2006.01)
  *F28F 21/06* (2006.01)
  *B32B 5/18* (2006.01)
  *B32B 27/30* (2006.01)
  *B32B 27/40* (2006.01)
  *B32B 27/06* (2006.01)
  *C08J 7/04* (2020.01)
  *F24F 12/00* (2006.01)
  *C08J 9/228* (2006.01)

(52) U.S. Cl.
  CPC ............ *B32B 27/308* (2013.01); *B32B 27/40* (2013.01); *C08J 7/04* (2013.01); *C09D 133/08* (2013.01); *C09D 139/06* (2013.01); *C09D 175/04* (2013.01); *F28F 21/06* (2013.01); *C08J 9/228* (2013.01); *C08J 2323/06* (2013.01); *C08J 2433/08* (2013.01); *C08J 2439/06* (2013.01); *C08J 2475/04* (2013.01); *F24F 12/006* (2013.01); *F28F 2245/02* (2013.01)

(58) Field of Classification Search
  CPC ..... Y10T 428/31551; Y10T 428/31562; Y10T 428/31573; Y10T 428/31591; Y10T 428/31855; Y10T 428/31862; Y10T 428/3188; Y10T 428/31909; Y10T 428/31928; C08K 3/22; C09D 201/00; C09D 5/00; C09D 7/61; C09D 133/062; C09D 175/04; C09D 201/02; C09D 133/08; C09D 139/06; A61L 27/34; A61L 29/085; A61L 31/10; C08G 18/833; C08L 2666/02; C08L 2666/04; C08L 2666/14; C08L 2666/16; C08L 2666/20; C08L 2666/22; C08L 39/06; C08L 61/20; C08L 71/02; C08L 75/04; B32B 27/065; B32B 27/30; B32B 27/308; B32B 27/40; B32B 5/18; C08J 2323/06; C08J 2433/08; C08J 2439/06; C08J 2475/04; C08J 7/04; C08J 9/228; F24F 12/006; F24F 7/08; F28D 21/0014; F28D 9/0062; F28F 13/003; F28F 21/00; F28F 21/003; F28F 21/06; F28F 2245/02; F28F 3/08
  See application file for complete search history.

(56) References Cited

U.S. PATENT DOCUMENTS

| | | | |
|---|---|---|---|
| 2011/0259572 | A1 | 10/2011 | Muratani et al. |
| 2015/0198390 | A1 | 7/2015 | Ootomo et al. |
| 2018/0265733 | A1 | 9/2018 | Komatsuzaki et al. |

FOREIGN PATENT DOCUMENTS

| | | | |
|---|---|---|---|
| JP | 2010111051 | A | 5/2010 |
| JP | 201720779 | A | 1/2017 |
| WO | 2014041746 | A1 | 3/2014 |
| WO | 2017051604 | A1 | 3/2017 |

\* cited by examiner

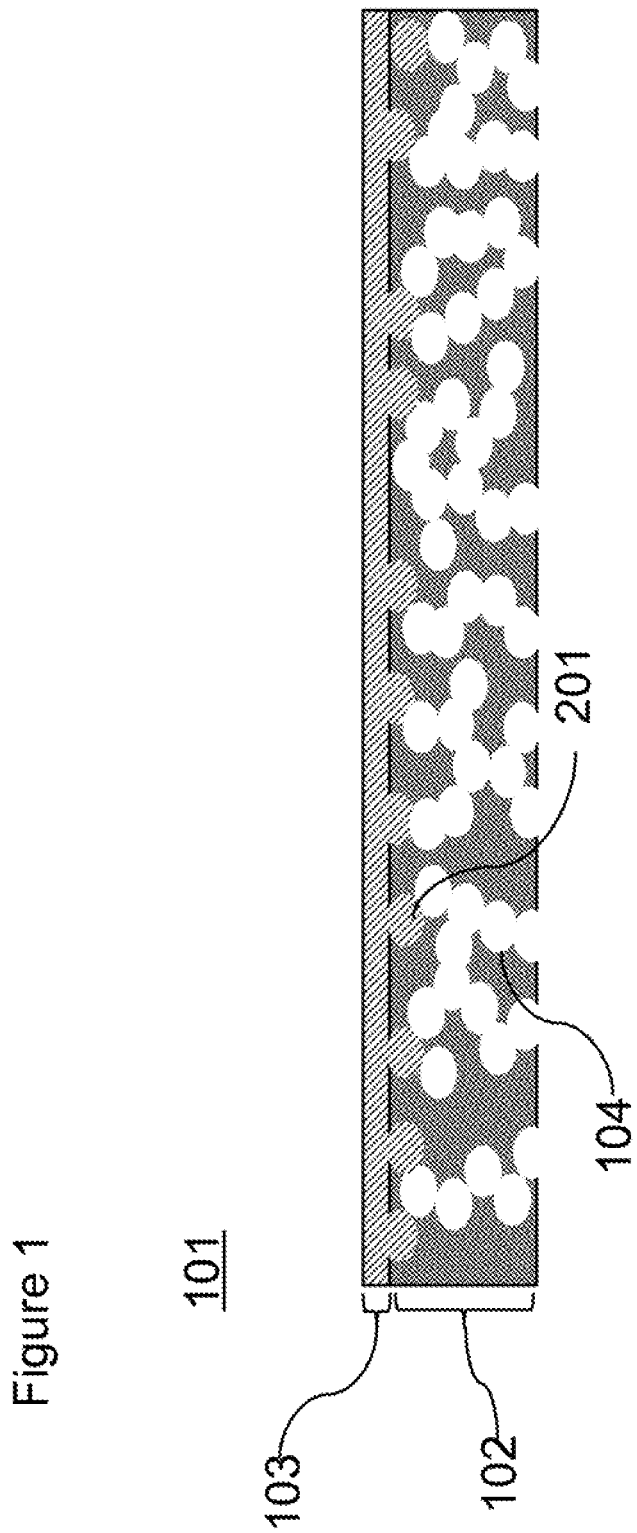

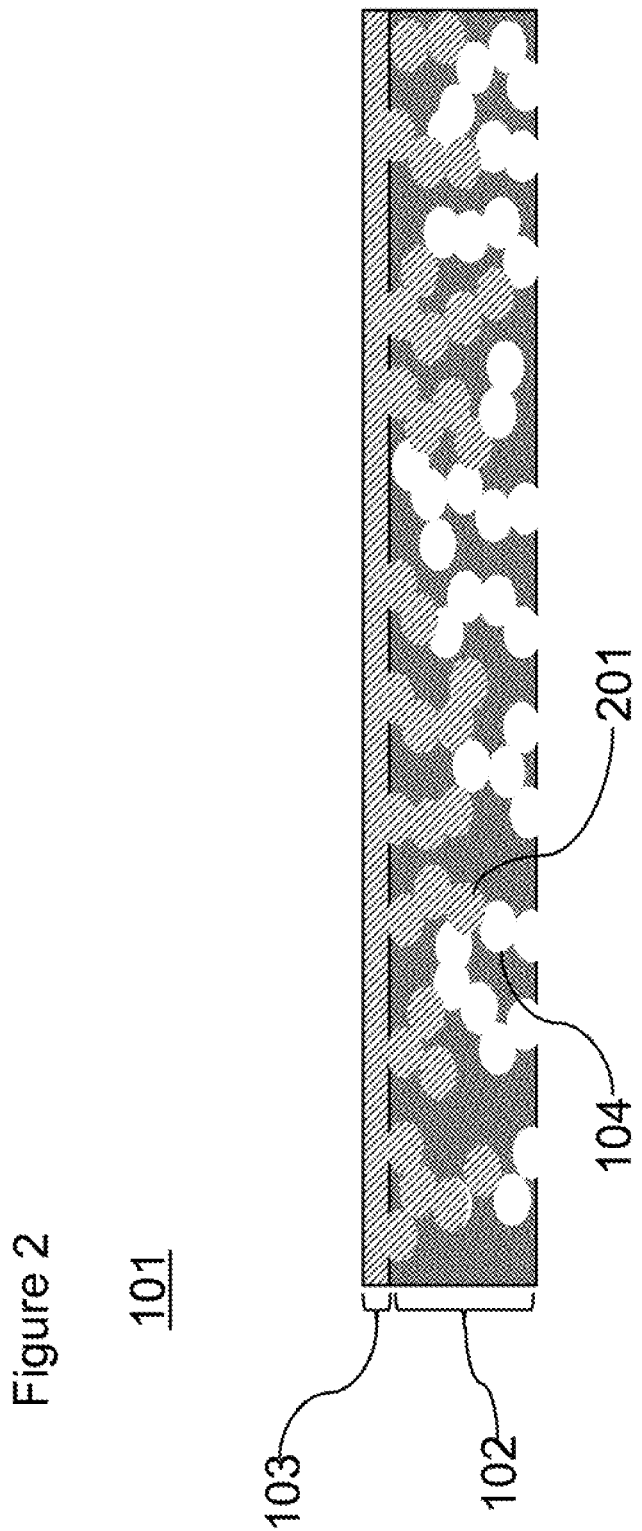

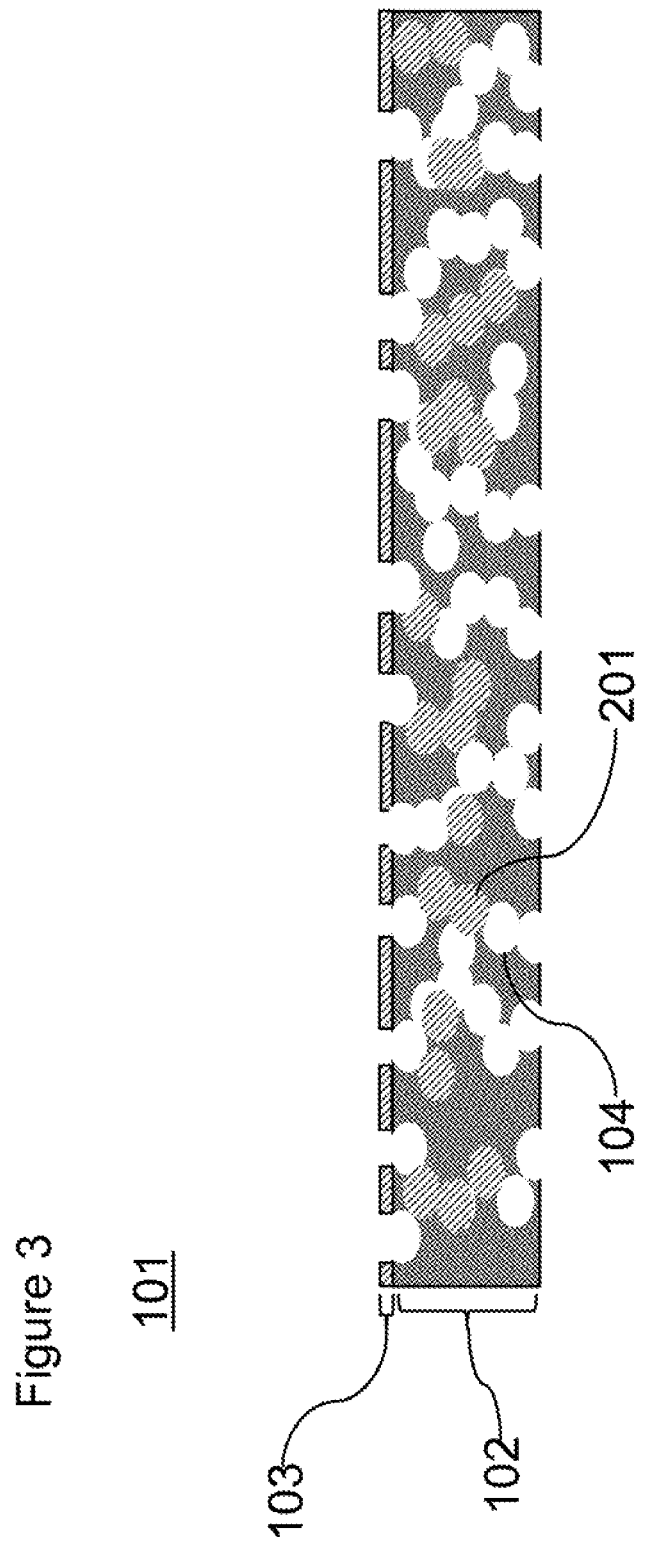

SHEET FOR HEAT EXCHANGE

CROSS REFERENCE TO RELATED APPLICATIONS

This is the U.S. National Phase application of PCT/JP2018/043938 filed Nov. 29, 2018 which claims priority to Japanese Patent Application No. 2017-233151, filed Dec. 5, 2017 and Japanese Patent Application No. 2018-034872, filed Feb. 28, 2018, the disclosures of each of these applications being incorporated herein by reference in their entireties for all purposes.

FIELD OF THE INVENTION

The present invention relates to a sheet for heat exchange elements production.

BACKGROUND OF THE INVENTION

Heat exchangers are attracting attention as energy-saving members of ventilating equipment for houses and buildings. A heat exchanger is composed mainly of an air flow path between the room and the outside, a heat exchange element, and a blower. In a heat exchange element, the "temperature" and "humidity" of the air exhausted from indoor to outdoor are transferred to the air supplied from outdoor to indoor, and returned to inside the room. A heat exchange element is composed mainly of two types of heat exchange element sheets, namely, a liner sheet and a corrugated sheet. In particular, the liner sheet is required to have heat transfer properties, moisture permeability, and gas shielding properties in order to increase the temperature exchange efficiency, humidity exchange efficiency, and effective ventilation rate of the heat exchange element, and studies have been conducted aiming to provide liner sheets with improved performance.

Here, examples of the heat exchange element sheet include a sheet of paper mainly composed of pulp of hydrophilic fibers or the like that contains a hygroscopic agent such as an inorganic salt (see Patent document 1) and a sheet of porous film with one surface provided with a hydrophilic resin film having gas shielding property and capable of transmitting water vapor (see Patent document 2). Patent document 2 discloses that the polyvinylpyrrolidone component of the hydrophilic resin film in the heat exchange element sheet is crosslinked, whereby the polyvinylpyrrolidone component of the hydrophilic resin film is prevented from dissolving into condensation water or the like attached on the hydrophilic resin film, so that the water resistance of the hydrophilic resin film is improved, leading to an increase in the water resistance of the heat exchange element sheet.

PRIOR ART DOCUMENTS

Patent Documents

Patent document 1: Japanese Unexamined Patent Publication (Kokai) No. 2008-14623
Patent document 2: Japanese Unexamined Patent Publication (Kokai) No. 2017-020779

SUMMARY OF THE INVENTION

With the popularization of heat exchangers, the demand for heat exchangers for use in bathrooms in cold districts, heated swimming pools, automobiles, and the like, has been increasing, but the heat exchange element sheet disclosed in Patent document 1 is disadvantageous in that the size changes due to condensation, icing, or the like and that dissolution of the inorganic salt into condensation water causes a decrease in the moisture permeability of the heat exchange element sheet.

Compared with this, the sheet for a heat exchange element disclosed in Patent document 2 is free of the above-mentioned problem that occurs with the sheet for a heat exchange element disclosed in Patent document 1. In addition, as described above, the hydrophilic resin film in the heat exchange element sheet contains crosslinked polyvinylpyrrolidone, and consequently has a high water resistance. Compared with this, however, the manufacturing process for this heat exchange element sheet contains a step in which a coating liquid for hydrophilic resin film formation is applied on a porous base material, followed by irradiating the coating film with ultraviolet rays to crosslink the polyvinylpyrrolidone component contained in the coating film, but this is disadvantageous in that the resulting heat exchange element sheet is low in shape stability as a result of curing and shrinking of the hydrophilic resin film in this step, leading to a low productivity of not only the heat exchange element sheet but also the heat exchange element produced by using this heat exchange element sheet.

Here, in the case of the heat exchange element sheet described in Patent document 2, if the polyvinylpyrrolidone component of the hydrophilic resin film contained in the sheet for heat exchange elements does not have a crosslinked structure, the problem of low shape stability of the sheet for heat exchange elements will not occur, but instead, the polyvinylpyrrolidone component will dissolve into condensation water formed through condensation or icing to cause the removal the hydrophilic resin film from the surface of the porous film and accordingly the hydrophilic resin film will be unable to block the pores in the porous film, consequently leading to poor gas shielding property of the sheet for heat exchange elements. Thus, in this case, the sheet for heat exchange elements will have the problem of low water resistance.

In view of the circumstances described above, an object of the present invention is to provide a sheet for heat exchange elements having a high water resistance (specifically, a high capability to maintain a high moisture permeability and high gas shielding property from before to after a service period in a service environment in which condensation or icing occurs) and also having a high shape stability to ensure a high productivity.

The present invention according to exemplary embodiments has the following features in order to solve these problems. Specifically, (1) a sheet for heat exchange elements including at least a laminate of a porous base material and a resin layer, the resin layer containing at least polyvinylpyrrolidone and/or vinylpyrrolidone copolymer and a urethane resin, (2) a sheet for heat exchange elements as set forth in (1), wherein the resin layer contains an acrylic resin, (3) a sheet for heat exchange elements as set forth in (2), wherein the acrylic resin contains an acrylic resin having a structure in which acrylate chains each having two or more carbon-carbon double bonds are crosslinked, (4) a sheet for heat exchange elements as set forth in either (2) or (3), wherein the acrylic resin has a crosslinked structure and the crosslinked structure contains a structure as represented by either chemical formula (I) or (II) given below:

[Chemical compound 1]

chemical formula (I)

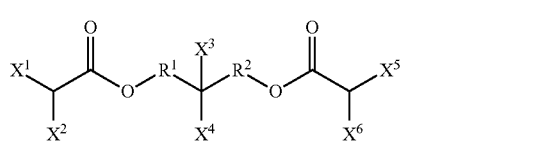

($R^1$ and $R^2$ denote alkyl chains having an appropriate length and $X^1$ to $X^6$ denote an appropriate element or molecular structure.)

[Chemical compound 2]

chemical formula (II)

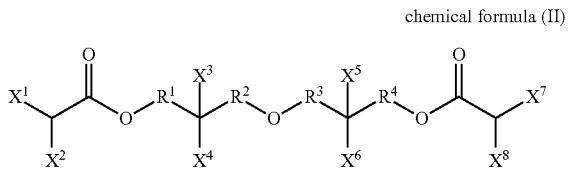

($R^1$ to $R^4$ each represent an alkyl chain having appropriate lengths and $X^1$ to $X^6$ each represent an appropriate element or molecular structure.)

(5) a sheet for heat exchange elements as set forth in any one of (1) to (4), wherein the content of the polyvinylpyrrolidone and/or vinylpyrrolidone copolymer is 50% by mass or more and 95% by mass or less relative to the entire resin layer, (6) a sheet for heat exchange elements as set forth in any one of (1) to (5), wherein the content of the polyvinylpyrrolidone and/or vinylpyrrolidone copolymer is 50% by mass or more and 90% by mass or less relative to the entire resin layer and the content ratio between the polyvinylpyrrolidone and/or vinylpyrrolidone copolymer and the urethane resin (content (mass %) of the polyvinylpyrrolidone and/or vinylpyrrolidone copolymer/content (mass %) of the urethane resin) is 1.0 or more and 9.0 or less, (7) a sheet for heat exchange elements as set forth in any one of (1) to (6), wherein the content of the polyvinylpyrrolidone and/or vinylpyrrolidone copolymer is 50% by mass or more and 85% by mass or less relative to the entire resin layer and the content ratio between the polyvinylpyrrolidone and/or vinylpyrrolidone copolymer and the urethane resin (content (mass %) of the polyvinylpyrrolidone and/or vinylpyrrolidone copolymer/content (mass %) of the urethane resin) is 2.0 or more and 6.0 or less, (8) a sheet for heat exchange elements as set forth in any one of (1) to (7), wherein the polyvinylpyrrolidone and/or vinylpyrrolidone copolymer has a crosslinked structure, (9) a sheet for heat exchange elements as set forth in any one of (1) to (8), wherein the basis weight of the resin layer is 0.1 g/m² or more and the ratio of the basis weight of the resin layer to the basis weight of the porous base material (basis weight of the resin layer/basis weight of the porous base material) is 0.18 or less,

(10) A method for producing a sheet for heat exchange elements as set forth in any one of (1) to (9), wherein a coating liquid composition containing a polyvinylpyrrolidone and/or vinylpyrrolidone copolymer, a urethane resin, and an acrylate having two or more carbon-carbon double bonds is applied on a porous base material to form a coating film, followed by exposing the coating film to ultraviolet ray,

(11) A heat exchange element including a sheet for heat exchange elements as set for in any one of (1) to (9), and

(12) A heat exchanger including a heat exchange element as set for in (11).

According to the present invention, it is possible to provide a sheet for heat exchange elements having high water resistance that serves to suppress the deterioration in performance (specifically, moisture permeability and gas shielding property) even when the sheet is used for a long period of time in a high humidity environment. Furthermore, since the sheet for heat exchange elements has high shape stability, the productivity in producing heat exchange elements containing this sheet for heat exchange elements can be increased.

BRIEF DESCRIPTION OF THE DRAWINGS

FIG. 1 gives a schematic cross-sectional view of a sheet for heat exchange elements according to an embodiment of the present invention.

FIG. 2 gives a schematic cross-sectional view of a sheet for heat exchange elements according to conventional technology.

FIG. 3 gives a schematic cross-sectional view of a sheet for heat exchange elements according to another embodiment in which the resin layer does not contain a urethane resin.

DETAILED DESCRIPTION OF EMBODIMENTS OF THE INVENTION

Hereinafter, embodiments of the present invention will be described.

[Sheet for Heat Exchange Elements]

The sheet for heat exchange elements according to embodiments of the present invention includes at least a laminate of a porous base material and a resin layer, the resin layer containing at least a polyvinylpyrrolidone and/or vinylpyrrolidone copolymer (hereinafter the polyvinylpyrrolidone and/or vinylpyrrolidone copolymer is occasionally referred to as "polyvinylpyrrolidone etc" and a urethane resin.

Here, in this laminate, the pores existing in the porous base material are blocked by the resin layer and this serves to improve the gas shielding property of this sheet for heat exchange. In a heat exchange element using this sheet for heat exchange elements, therefore, the incoming air and the outgoing air are isolated completely from each other.

In addition, the polyvinylpyrrolidone etc. and urethane resin contained in the resin layer ensure the transfer of water vapor from one surface to the other surface of the resin layer, allowing the sheet for heat exchange elements to have high moisture permeability. Furthermore, since the resin layer contains a urethane resin in addition to polyvinylpyrrolidone etc., the resin layer can be high in water resistance even when the polyvinylpyrrolidone etc. do not have crosslinked structures, and as a result, the sheet for heat exchange elements will also have a high water resistance. In addition, since it is not necessary to crosslink the polyvinylpyrrolidone etc. in order to increase the water resistance, the sheet for heat exchange elements will have a high shape stability. Incidentally, as will be described in detail later, since the resin layer contains a urethane resin in addition to the polyvinylpyrrolidone etc., the resin layer can be high in shape stability even when it contains a crosslinked polyvinylpyrrolidone etc.

Here, in the case where the resin layer contains a urethane resin in addition to the polyvinylpyrrolidone etc., the mechanism through which the sheet for heat exchange elements develops a high water resistance even when the polyvinylpyrrolidone etc. do not have crosslinked structures is inferred as follows. That is, since the urethane resin is insoluble in water, the outflow of the urethane resin itself from the resin layer is suppressed. Then, it is considered that in the resin layer, the urethane resin having the above-mentioned properties interacts with the polyvinylpyrrolidone etc. in some manner to prevent the water-soluble polyvinylpyrrolidone etc. from flowing out of the resin layer while the urethane resin is localized on the surface of the resin layer to form a water-insoluble film on the surface of the resin layer, thereby preventing the polyvinylpyrrolidone etc. from flowing out of the resin layer and as a result, leading to a sheet for heat exchange elements having a high water resistance.

Here, in order to largely enhance the effect of suppressing the outflow of the polyvinylpyrrolidone etc. from the resin layer, it is preferable that the content ratio between the polyvinylpyrrolidone etc. and the urethane resin in the resin layer (content (mass %) of polyvinylpyrrolidone etc./content (mass %) of urethane resin) is 9.0 or less. From the above point of view, the content ratio between the polyvinylpyrrolidone etc. and the urethane resin is more preferably 7.0 or less, still more preferably 6.0 or less, and particularly preferably 5.0 or less. On the other hand, from the viewpoint of increasing the moisture permeability of the sheet for heat exchange elements, it is preferable that the content ratio between the polyvinylpyrrolidone etc. and the urethane resin is 1.0 or more, still more preferably 1.5 or more, and still more preferably 2.0 or more. Here, the content of the polyvinylpyrrolidone etc. and the content of the urethane resin both mean the proportion to the entire resin layer.

The thickness of the sheet for heat exchange elements is preferably as small as possible from the viewpoint of the temperature exchange efficiency and the pressure loss in the heat exchange element production process. If it is excessively thin, on the other hand, the strength of the heat exchange element will be low, and the handleability in the heat exchange element production process will deteriorate. From the above considerations, the thickness of the sheet for heat exchange elements is preferably 5 μm or more, and more preferably 9 μm or more. Furthermore, the thickness of the sheet for heat exchange elements is preferably 30 μm or less, and more preferably 15 μm or less.

The basis weight of the sheet for heat exchange elements is preferably 3 g/m$^2$ or more, and more preferably 5 g/m$^2$ or more. Furthermore, the basis weight of the sheet for heat exchange elements is preferably 15 g/m$^2$ or less, and more preferably 10 g/m$^2$ or less. Setting the basis weight of the sheet for heat exchange elements to a value not more than the above-mentioned upper limit makes it possible to decrease the thickness of the sheet for heat exchange elements and improve the heat and humidity exchange efficiencies. On the other hand, setting the basis weight of the sheet for heat exchange elements to a value not less than the above-mentioned lower limit makes it possible to allow the sheet for heat exchange elements to have a strength required to withstand the heat and tension that occur during corrugating and other processing in the heat exchange element molding step.

The sheet for heat exchange elements according to the present invention can be used both as the liner sheet and as the corrugated sheet of a heat exchange element, but it is particularly suitable for use as the liner sheet.

[Porous Base Material]

The porous base material used for exemplary embodiments of the present invention has air permeability and moisture permeability, and contains a large number of fine through-holes. A porous base material containing a polymer resin as a raw material is used suitably because of its low strength reduction suffered in a high humidity environment and easiness to form a thin film therefrom. Good examples of the polymer resin used to produce the porous base material include polyolefin resin, polycarbonate, polyamide, polyimide, polyamideimide, aromatic polyamide, and fluorine-based resin, of which polyolefin resin is preferred from the viewpoint of production cost, availability, and the like. Examples of monomer components useful for producing such polyolefin resin include, but not limited to, ethylene, propylene, 1-butene, 1-pentene, 3-methylpentene-1,3-methyl-1-butene, 1-hexene, 4-methyl-1-pentene, 5-ethyl-1-hexene, 1-heptene, 1-octene, 1-decene, 1-dodecene, 1-tetradecene, 1-hexadecene, 1-heptadecene, 1-octadecene, 1-eicosene, vinyl cyclohexene, styrene, allyl benzene, cyclopentene, norbornene, and 5-methyl-2-norbornene, as well as copolymers composed of at least two selected from the group consisting of homopolymers thereof and monomer components thereof, and blends of these homopolymers and copolymers. In addition to the above monomer components, other components such as vinyl alcohol and maleic anhydride may be used for copolymerization. For the porous base material, in particular, it is more preferable that one or more selected from the group consisting of ethylene and propylene are adopted as the monomer components used to constitute the above resin, from the viewpoint of control of porosity and pore diameter, film forming property, production cost reduction, and the like.

The basis weight of the porous base material is preferably 15 g/m$^2$ or less, more preferably 10 g/m$^2$ or less, and still more preferably 7 g/m$^2$ or less, whereas it is preferably 1 g/m$^2$ or more, more preferably 3 g/m$^2$ or more, and still more preferably 5 g/m$^2$ or more. Setting the basis weight of the porous base material to a value not more than the above-mentioned upper limit makes it possible to decrease the thickness of the porous base material and improve the heat and humidity exchange efficiencies of the sheet for heat exchange elements that contains the porous base material. On the other hand, setting the basis weight of the porous base material to a value not less than the above-mentioned lower limit makes it possible to allow the sheet for heat exchange elements to have a strength required to withstand the heat and tension that occur in the coating liquid application step and during corrugating and other processing in the heat exchange element molding step.

The thickness of the porous base material is preferably 30 μm or less, more preferably 20 μm or less, and still more preferably 15 μm or less, whereas it is preferably 2 μm or more, more preferably 5 μm or more, and still more preferably 10 μm or more. Setting the thickness of the porous base material to a value not more than the above-mentioned upper limit makes it possible to improve the heat and humidity exchange efficiencies of the sheet for heat exchange elements. On the other hand, setting the thickness of the porous base material to a value not less than the above-mentioned lower limit makes it possible to allow it to have a strength required to withstand the heat and tension that occur in the coating liquid application step for coating the first surface of the porous base material and during corrugating and other processing in the step for producing a heat exchange element by molding the sheet for heat exchange elements that contains the porous base material.

The porous base material preferably has a density of 0.2 g/cm$^3$ or more, more preferably 0.3 g/cm$^3$ or more, and still more preferably 0.4 g/cm$^3$ or more. On the other hand, it is preferably 8.0 g/cm$^3$ or less, more preferably 7.0 g/cm$^3$ or less, and still more preferably 6.0 g/cm$^3$ or less. The density of the porous base material has large influence on the moisture permeability of the sheet for heat exchange elements, and the moisture permeability of the sheet for heat exchange elements can be increased by setting the density to a value not more than the above-mentioned upper limit. On the other hand, setting the density to a value not less than the above-mentioned lower limit makes it possible to allow the porous base material to have a high wettability with the coating liquid. This allows the first surface of the porous base material to be coated with a thin film of the coating liquid.

The porous base material preferably has a porosity of 20% or more, more preferably 30% or more, and still more preferably 40% or more. It is considered that the porosity of a porous base material correlates with its moisture permeability, and as the porosity increases, the moisture permeability of the porous base material increases and accordingly the moisture permeability of the sheet for heat exchange elements that contains the porous base material also increases.

The porous base material preferably has a pore diameter of 20 nm or more, more preferably 30 nm or more, and still more preferably 40 nm or more. On the other hand, it is preferably 100 μm or less, more preferably 80 μm or less, and still more preferably 60 μm or less. It is considered that the pore diameter of a porous base material correlates with its moisture permeability, and controlling the pore diameter not less than the aforementioned lower limit ensures an increase in the moisture permeability of the porous base material and accordingly an increase in the moisture permeability of the sheet for heat exchange elements. On the other hand, setting the pore diameter to a value not more than the above-mentioned upper limit makes it possible to allow the porous base material to have a high wettability with the coating liquid. This allows the first surface of the porous base material to be coated with a thin film of the coating liquid.

The porous base material preferably has an air permeability of 2,500 sec/100 ml or less, more preferably 300 sec/100 ml or less, and still more preferably 200 sec/100 ml or less. It is considered that the air permeability of a porous base material correlates with its moisture permeability, and as the air permeability decreases, the moisture permeability of the sheet for heat exchange elements increases.

The porous base material preferably has a moisture permeability of 80 g/m$^2$/hr or more, more preferably 90 g/m$^2$/hr or more, and still more preferably 100 g/m$^2$/hr or more. A higher moisture permeability of the porous base material is preferable because it leads to an increase in the moisture permeability of the resulting sheet for heat exchange elements and an increase in the humidity exchange efficiency when a heat exchange element is produced using the sheet for heat exchange elements.

Generally known wet methods and generally known dry methods may be adopted to mold the porous base material.

The resin used in the porous base material may contain various additives such as antioxidant, thermal stabilizer, light stabilizer, neutralizing agent, antistatic agent, organic particle based lubricant, antiblocking agent, filler, and incompatible polymer unless they impair the effect of the present invention. In particular, it is preferable to add an antioxidant for the purpose of suppressing oxidative degradation due to thermal history of polypropylene etc. Furthermore, surface modification treatments including corona treatment, plasma treatment, surfactant impregnation, and hydrophilization treatment (such as surface grafting) may be performed as required.

[Resin Layer]

The resin layer used for exemplary embodiments of the present invention contains at least polyvinylpyrrolidone etc. and a urethane resin. The content of polyvinylpyrrolidone etc. in the resin layer used for the present invention is preferably 50 mass % or more, more preferably 60 mass % or more, and particularly preferably 70 mass % or more, relative to the entire resin layer, whereas it is preferably 95 mass % or less, more preferably 90 mass % or less, still more preferably 85 mass % or less, and particularly preferably 80 mass % or less. Setting the content of polyvinylpyrrolidone etc. to a value not less than the above-mentioned lower limit makes it possible to allow the sheet for heat exchange elements to have a high moisture permeability. Setting the content of polyvinylpyrrolidone etc. to a value not more than the above-mentioned upper limit makes it possible to allow the sheet for heat exchange elements to have a high water resistance. Here, in the case where the resin layer contains both polyvinylpyrrolidone and a vinylpyrrolidone copolymer, the above content refers to the total content of the polyvinylpyrrolidone and the vinylpyrrolidone copolymer.

(1) Polyvinylpyrrolidone and/or Vinylpyrrolidone Copolymer

The resin layer used for exemplary embodiments of the present invention contains polyvinylpyrrolidone and/or vinylpyrrolidone copolymer. Containing polyvinylpyrrolidone and/or a vinylpyrrolidone copolymer allows the resin layer to have a high hygroscopicity, and the sheet for heat exchange elements having the resin layer formed thereon can develop a high moisture permeability. The hygroscopicity of the polyvinylpyrrolidone etc. is preferably such that the moisture absorption rate at 23° C. and 75% RH is 10 mass % or more and 50 mass % or less, more preferably 15 mass % or more and 48 mass % or less, and particularly preferably 25 mass % or more and 45 mass % or less. When the moisture absorption rate is not less than the above-mentioned lower limit, the resin layer can develop a high hygroscopicity, making it possible to obtain a sheet for heat exchange elements having a high moisture permeability. When the moisture absorption rate is not more than the above-mentioned upper limit, swelling of the resin layer due to moisture absorption can be suppressed, making it possible to obtain a sheet for heat exchange elements having a high water resistance.

The polyvinylpyrrolidone used for exemplary embodiments of the present invention is a polymer formed through polymerization of N-vinylpyrrolidone alone, and the vinylpyrrolidone copolymer is a polymer formed through copolymerization of mainly N-vinylpyrrolidone monomers in combination with vinyl acetate, vinyl caprolactam, or the like as comonomers. The types and content ratios (comonomer/main monomer) of the aforementioned comonomers in the vinylpyrrolidone copolymer are not particularly limited as long as the effect of the present invention is not impaired, and appropriate ones may be selected in consideration of their solubility in the solvent used and the physical properties of the coating liquid. The molecular weight of the polyvinylpyrrolidone or the vinylpyrrolidone copolymer is not particularly limited, but the weight average molecular weight of the polyvinylpyrrolidone or the vinylpyrrolidone copolymer is preferably 1,000 or more, 600,000 or less, more preferably 60,000 or more, 500,000 or less, and particularly preferably 150,000 or more, 400,000 or less, because their viscosity can be adjusted easily to a value that permits the formation of a coating film having a uniform thickness when coating liquids prepared from them are applied to the porous base material. Examples of the above polyvinylpyrrolidone include products of the Luvitec K (registered trademark) series manufactured by BASF. Examples of the above vinylpyrrolidone copolymer include products of the Luvitec VA (registered trademark) series and the Luvicap (registered trademark) series.

It is also preferable that at least part of the polyvinylpyrrolidone etc. contained in the resin layer is crosslinked. If the above-described constitution is adopted, the polyvinylpyrrolidone etc. will be prevented more effectively from dissolving into condensation water in the case where the heat exchange element is used in an environment in which condensation or icing occurs on the surface of the sheet for heat exchange elements. Therefore, the content of polyvinylpyrrolidone etc. contained in the resin layer in the sheet for heat exchange elements in the heat exchange element after use in the above environment hardly decreases as compared with the content of the polyvinylpyrrolidone etc. contained in the resin layer in the sheet for heat exchange elements in the heat exchange element before use, and as a result, the above resin layer in the sheet for heat exchange elements after use contains the polyvinylpyrrolidone etc., which allow the sheet for heat exchange elements to have a high moisture permeability, at a content as high as that before use. Accordingly, the sheet for heat exchange elements after use suffers little decrease in moisture permeability as compared with the sheet for heat exchange elements before use, whereby the water resistance of the sheet for heat exchange elements will further improve. It is considered that the mechanism through which the crosslinked structure works to more effectively prevent the polyvinylpyrrolidone etc. from dissolving into condensation water is as follows: the apparent molecular weight of the polyvinylpyrrolidone etc. is increased by the crosslinking to allow the urethane resin to work more effectively in suppressing the outflow of the polyvinylpyrrolidone etc. out of the resin layer and at the same time the number of carbonyl groups, which can work to improve the water solubility of the polyvinylpyrrolidone etc., is decreased by the crosslinking.

The shape stability of the sheet for heat exchange elements will increase even when only a part of the polyvinylpyrrolidone etc. contained in the resin layer is crosslinked. Regarding the mechanism of realizing this effect, it is considered as follows: the resin layer contained in the sheet for heat exchange elements according to an embodiment of the present invention includes a urethane resin in addition to the polyvinylpyrrolidone etc., and since this urethane resin is high in flexibility, the contraction stress generated in the resin layer by the crosslinking of polyvinylpyrrolidone etc. is relaxed by the highly flexible urethane resin. Furthermore, it is considered that the effect described below also contributes to the improvement in the shape stability of the sheet for heat exchange elements. That is, the existence of the urethane resin in addition to polyvinylpyrrolidone etc. in the resin layer serves to prevent the coating film for resin layer formation from entering the pores present in the porous base material. Then, as a result of the prevention of the coating film for resin layer formation from entering the pores present in the porous base material, a smaller amount of the coating film for resin layer formation per unit surface area of the sheet for heat exchange elements can work to form a resin layer in which effectively block the pores present in the porous base, in the case where the resin layer is formed using a coating film for resin layer formation that contains both polyvinylpyrrolidone etc. and urethane resin, as compared with the case where the resin layer is formed using a coating film for resin layer formation that contains polyvinylpyrrolidone etc. but contains no urethane resin. Therefore, it is considered as follows: the smaller the amount of the coating film for resin layer formation per unit surface area of the sheet for heat exchange elements, the smaller the ratio of the basis weight of the resin layer to the basis weight of the porous base material (basis weight of the resin layer/basis weight of the porous base material), and as a result, the stress of the resin layer containing polyvinylpyrrolidone etc. having a crosslinked structure working to change the shape of the sheet for heat exchange elements will have a smaller influence on the performance of the porous base material in stabilizing the shape of the sheet for heat exchange elements, thereby allowing the sheet for heat exchange elements to have an increased shape stability.

The degree of entry of the coating film for resin layer formation into the pores existing in the porous base material will be described below with reference to drawings. FIG. 1 gives a conceptual cross-sectional view of a sheet for heat exchange elements according to an embodiment of the present invention. In this sheet for heat exchange elements 101, the pores 104 present in the porous base material 102 are blocked by the resin layer 103 present on one surface of the porous base material, and part of the resin layer 103 enters part of the pores 104 present in the porous base material 102. FIG. 2 gives a conceptual cross-sectional view of a typical sheet for heat exchange elements that represents the conventional technology. The resin layer 103 present in the sheet for heat exchange elements 101 contains polyvinylpyrrolidone but does not contain urethane resin. In this sheet for heat exchange elements 101, too, as in the case of the sheet for heat exchange elements shown in FIG. 1, the pores 104 present in the porous base material 102 are blocked by the resin layer 103 present on one surface of the porous base material, and part of the resin layer 103 enters part of the pores 104 present in the porous base material 102. Here, as seen from a comparison between the sheet for heat exchange elements in FIG. 1 and the sheet for heat exchange elements in FIG. 2, the resin layer present in the sheet for heat exchange elements contains a urethane resin in addition to polyvinylpyrrolidone etc. to suppress the entry of the coating film for resin layer formation into pores present in the porous base material in the case of the sheet for heat exchange elements of FIG. 1, and accordingly, the ratio of the total volume of the pores 201 filled with part of the resin layer to the total volume of all the pores 104 present in the porous base material 102 is smaller than the ratio of the total volume of the pores 201 filled by part of the resin layer to the total volume of all the pores 104 present in the porous base material 102 in the sheet for heat exchange elements of FIG. 2. Therefore, in the case of the sheet for heat exchange elements according to an embodiment of the present invention shown in FIG. 1, the pores present in the porous base material can be blocked by a resin layer having a smaller basis weight than the conventional sheet for heat exchange elements shown in FIG. 2. FIG. 3 gives a conceptual cross-sectional view of another typical sheet for heat exchange elements that represents the conventional technology. The resin layer 103 present in the sheet for heat exchange elements 101, too, contains polyvinylpyrrolidone but does not contain urethane resin. Here, the basis weight of this resin layer 103 is nearly equal to that of the resin layer present in the sheet for heat exchange elements according to an embodiment of the present invention shown in FIG. 1. However, in this conventional sheet for heat exchange elements, many portions of the resin layer that contains polyvinylpyrrolidone but does not contain urethane resin fill deep pores present in the porous base material. As a result, the conventional sheet for heat exchange elements have pores that are not blocked by the porous resin layer 103, and these pores penetrate from one surface to the other surface of the sheet for heat exchange elements. Accordingly, the conventional sheet for heat exchange elements is inferior in gas shielding property.

In addition, urethane resin has the feature of easily forming a tough, thin film and accordingly serves to form a tough resin layer that can more reliably block the pores present in the porous base material even when the coating film for resin layer formation laid on the surface of the porous base material has a small film thickness.

As a result of these features, the resin layer in which the polyvinylpyrrolidone etc. contained is at least partly crosslinked serves to produce a sheet for heat exchange elements having a very high water resistance and shape stability.

(2) Urethane Resin

The resin layer present in the sheet for heat exchange elements according to exemplary embodiments of the present invention contains urethane resin. The urethane resin is insoluble in water and accordingly, serves to realize a higher water resistance as compared with the case where the resin layer is produced from only a water soluble resin such as polyvinylpyrrolidone. In addition, since urethane resins have strong and flexible physical properties, a resin layer containing a urethane resin can be tough even when it is thin and can effectively block the pores present in the porous base material, and furthermore, such a resin layer suffers little cracking or peeling even when the sheet for heat exchange elements is bent or undergo expansion and contraction. In addition, although the pores present in the porous base material may tend to suffer deformation due to bending, expansion, contraction, etc., of the sheet for heat exchange elements, the resin layer containing a high flexible polyurethane resin can work more reliably to block such deformed pores. If the pores are more reliably blocked by the resin layer, then the sheet for heat exchange elements will be able to stably exhibit high gas shielding properties. As described above, if the resin layer present in the sheet for heat exchange elements according to an embodiment of the present invention contains a urethane resin, this resin layer contributes to the realization of good gas shielding property in the sheet for heat exchange elements. Furthermore, it is preferable that the basis weight of the urethane resin in the resin layer is 0.02 g/m$^2$ or more because the gas shielding property of the sheet for heat exchange elements will be further improved and the shape stability of the sheet for heat exchange elements will be further improved in the case where the polyvinylpyrrolidone etc. present in the resin layer has a crosslinked structure. For the same reason as described above, the basis weight of the urethane resin in the resin layer is more preferably 0.04 g/m$^2$ or more, and still more preferably 0.08 g/m$^2$ or more. On the other hand, it is preferable that the basis weight of the urethane resin in the resin layer is 0.6 g/m$^2$ or less for the reason that the heat-exchange-element sheets will be high in moisture permeability. For the same reason as described above, the basis weight of the urethane resin in the resin layer is more preferably 0.20 g/m$^2$ or less, and still more preferably 0.16 g/m$^2$ or less.

It is preferable for the urethane resin used for the present invention to have a hydrophilic group such as hydroxyl group and carbonyl group. As a result of the existence of a hydrophilic group, the urethane resin will be high in affinity with the polyvinylpyrrolidone etc. and accordingly it will be able to easily form a resin layer having a uniform film thickness when used in combination with polyvinylpyrrolidone etc. When the urethane resin has a hydrophilic group, furthermore, the urethane resin will be able to disperse easily in an aqueous solvent and accordingly, water can be used in some cases as solvent for preparing a coating liquid for resin layer formation.

The urethane resin used for the present invention may be a polyurethane resin having a weight average molecular weight of 10,000 or more (hereinafter, a polyurethane resin having a weight average molecular weight of 10,000 or more will be occasionally referred to as a polyurethane resin). In the case where the resin layer contains a polyurethane resin, it is preferable that the polyurethane resin is dispersed in water or an organic solvent and is in the form of a dispersion liquid when added to the coating liquid for resin layer formation. The use of such a dispersion liquid of the polyurethane resin is desirable because it allows a resin layer having a uniform thickness to be formed under low-temperature heat treatment conditions. Since the porous base material used for the present invention may be low in heat resistance, the glass transition temperature of the polyurethane resin is preferably 80° C. or less, and particularly preferably 60° C. or less. If the glass transition temperature is in the above-mentioned preferable range, it is preferable because the thermal influence on the porous base material can be reduced in the drying step for forming the resin layer.

Examples of the above polyurethane resin include the ADEKA Bontighter (registered trademark) series, manufactured by Asahi Denka Kogyo K.K., Olester (registered trademark) series, manufactured by Mitsui Toatsu Kagaku Kabushiki Kaisha, Bondic (registered trademark) series and HYDRAN (registered trademark) series, manufactured by DIC Corporation, Impranil (registered trademark) series, manufactured by Bayer, SOFLANATE (registered trademark) series manufactured by Nihon Soflan Chemical & Engineering Co., Ltd., Poise (registered trademark) series, manufactured by Kao Corporation, Sanprene (registered trademark) series manufactured by Sanyo Chemical Industries Ltd., Izelax (registered trademark) series, manufactured by Hodogaya Chemical Co., Ltd., Superflex series, manufactured by Dai-Ichi Kogyo Seiyaku Co., Ltd, NeoRez (registered trademark) series, manufactured by Zeneca, and Sancure (registered trademark) series, manufactured by Lubrizol Corporation.

(3) Additives

The resin layer according to the present invention may contain additives as required. Examples of the additives include inorganic particles, organic particles, flame retardants, fungicides, preservatives, flame retardants, dyes, and pigments.

The addition of inorganic particles or organic particles serves to control the smoothness of the surface of the sheet for heat exchange elements in a preferred state. Furthermore, the use of inorganic particles or organic particles having a hydrophilizing surface tends to improve the hygroscopicity of the resin layer.

The addition of a fungicide or a preservative can work to suppress the generation of mold, offensive odor, etc., that may occur when the sheet for heat exchange elements according to exemplary embodiments of the present invention is used in a high humidity environment or in a wet state due to condensation.

The addition of a flame retardant serves to improve the flame retardancy of the sheet for heat exchange elements according to exemplary embodiments of the present invention.

The addition of a dye or a pigment serves to color the sheet for heat exchange elements in a desired color tone. In addition, the coloring of the resin layer allows the resin layer to become high in visibility, thereby facilitating easy defect inspection and quality control in the manufacturing process for the sheet for heat exchange elements.

(4) Basis Weight of Resin Layer

If the basis weight of the resin layer is too small, the pores present in the porous base material may not be completely blocked in some cases, possibly leading to a sheet for heat exchange elements having poor gas shielding property. If it is too large, on the other hand, the sheet for heat exchange elements will be low in moisture permeability in some cases. Furthermore, when the resin layer absorbs and releases moisture, or when the polyvinylpyrrolidone etc. present in the resin layer have a crosslinked structure, the resin layer will suffer from a large shrinkage in some cases, possibly leading to a deformed sheet for heat exchange elements. As a result, the basis weight of the resin layer is preferably 0.1 $g/m^2$ or more, more preferably 0.2 $g/m^2$ or more, and particularly preferably 0.4 $g/m^2$ or more. On the other hand, the basis weight of the resin layer is preferably 3.0 $g/m^2$ or less, more preferably 1.0 $g/m^2$ or less, and particularly preferably 0.8 $g/m^2$ or less. When the basis weight of the resin layer falls within the above preferable range, the sheet for heat exchange elements according to the present invention can develop good gas shielding property and high shape stability.

(5) Production Method for Resin Layer

A resin layer can be formed on the base material by applying such a coating liquid for resin layer formation as described above that contains polyvinylpyrrolidone etc., urethane resin, and, if necessary, an additive and a solvent to the base material and drying the solvent if necessary. As another good procedure, a resin layer may be formed by preparing a coating liquid for resin layer formation that contains polyvinylpyrrolidone etc. and a coating liquid that contains a urethane resin and forming a stack of resin films that are prepared separately from the two coating liquids. In this case, it is possible to appropriately decide which of the resin film containing polyvinylpyrrolidone etc. and the resin film containing urethane resin is first formed on the porous base material. For the present invention, it is preferable to use a coating liquid containing both polyvinylpyrrolidone etc. and a urethane resin to form a resin layer from the viewpoint of the formation of a uniform resin layer and simplification of the coating step.

Furthermore, the solvent used for the coating liquid is preferably an aqueous solvent. This is because the use of an aqueous solvent in the coating liquid serves to depress rapid evaporation of the solvent during the drying step and form a resin layer having a uniform thickness, as well as being low in environment load.

Here, examples of the aqueous solvent include water-soluble solvents containing one or more selected from the group consisting of water, alcohols such as ethanol, isopropyl alcohol, and butanol, ketones such as acetone and methyl ethyl ketone, and glycols such as ethylene glycol, diethylene glycol, and propylene glycol.

Good methods for applying the coating liquid to the porous base material include generally known wet coating methods such as spray coating, dip coating, spin coating, knife coating, kiss coating, gravure coating, slot die coating, roll coating, bar coating, screen printing, inkjet printing, pad printing, and other types of printing. Coating may be performed in several steps and may be performed by a combination of two different types of coating techniques. It is preferable to use a wet coating method selected from the following: gravure coating, bar coating, and slot die coating.

After the coating step, a drying step is performed to remove the solvent from the coating liquid applied. Useful solvent removal methods include a convective hot air drying method in which hot air is applied to the porous base material, a radiant heat drying method in which infrared rays radiated from an infrared drying apparatus are applied to and absorbed by the base material so that the rays are converted into heat which is then used for drying, and conductive heat drying method in which drying is achieved by heating through heat conduction from a wall surface heated by a heating medium. Of these, convective hot air drying is preferable because the drying speed is high. Processing has to be performed at a temperature not more than the melting point of the resin used in the porous base material, and the drying temperature is more preferably 80° C. or less and still more preferably 60° C. or less. The use of a drying temperature in the above range is preferred because the rate of shrinkage of the porous base material caused by the heating can be controlled at 5% or less.

(6) Crosslinking

It is preferable that the resin layer formed on the base material contains polyvinylpyrrolidone etc. having a crosslinked structure. The existence of polyvinylpyrrolidone etc. having a crosslinked structure is preferable because it permits the production of a sheet for heat exchange elements having a high water resistance. An improved water resistance of the sheet for heat exchange elements serves to suppress such phenomena as elution and uneven distribution of the polyvinylpyrrolidone etc. that may occur when the resin layer is in a high humidity environment or comes in direct contact with water.

The polyvinylpyrrolidone etc. may cure and shrink when being crosslinked, thereby reducing the shape stability of the sheet for heat exchange elements. The stress due to such curing and shrinkage increases with an increasing basis weight of the resin layer. On the other hand, as the basis weight of the porous base material increases, it becomes more resistant to the stress caused by curing and shrinkage. Therefore, in order to maintain a high shape stability of the sheet for heat exchange elements, it is preferable that the basis weight of the resin layer is small whereas the basis weight of the porous base material is large. More specifically, the ratio of the basis weight of the resin layer to the basis weight of the porous substrate (basis weight of the resin layer/basis weight of the porous base material) is preferably 0.18 or less and more preferably 0.10 or less. If the ratio is in the above preferable range, it is preferable because polyvinylpyrrolidone etc. having a crosslinked structure woks to form a sheet for heat exchange elements that is higher in shape stability. On the other hand, although the lower limit of the basis weight ratio is not particularly limited, it is preferably 0.01 or more because the gas shielding property can be enhanced. Furthermore, regardless of the basis weight of the porous base material, the lower limit of the basis weight of the resin layer is preferably 0.1 $g/m^2$ or more, and more preferably 0.2 $g/m^2$ or more. If the basis weight is in the above preferable range, it serves to form a sheet for heat exchange elements that is higher in shape stability. On the other hand, although the upper limit of the basis weight of the resin layer is not particularly limited, it is preferably 3.0 $g/m^2$ or less because the sheet for heat exchange elements will be high in shape stability when the polyvinylpyrrolidone etc. has a crosslinked structure.

The method used to achieve crosslinking is not particularly limited, but a good method is to modify the composition of the coating film by performing active energy ray irradiation treatment such as ultraviolet irradiation, which is preferable because it does not cause a significant temperature rise and significant damage to the porous base material. The ultraviolet treatment may be achieved by performing the step only once or performing it twice or more times repeatedly. When the ultraviolet treatment is performed, the oxygen concentration may be lowered in order to suppress reaction inhibition that may be caused by oxygen. When performing the treatment at a lowered oxygen concentration, it is preferable that the oxygen gas concentration is 1.0% by volume or less, and more preferably 0.5% by volume or less, relative to the total gas volume in the system which account for 100% by volume. The relative humidity may be set to an arbitrary value. For the ultraviolet ray treatment, furthermore, it is preferable that the oxygen concentration is reduced with nitrogen gas.

As the ultraviolet ray generation source, a known device such as high pressure mercury lamp, metal halide lamp, microwave type electrodeless lamp, low pressure mercury lamp, and xenon lamp may be used.

The cumulative light quantity in the ultraviolet ray irradiation step is preferably 50 to 3,000 mJ/cm$^2$, more preferably 100 to 1,000 mJ/cm$^2$, and particularly preferably 250 to 700 mJ/cm$^2$. The cumulative light quantity is preferably 50 mJ/cm$^2$ or more because the water resistance of the resin layer will be improved. A cumulative light quantity of 3,000 mJ/cm$^2$ or less is preferable because damage to the base material can be reduced.

(7) Acrylic Resin

The resin layer preferably contains acrylic resin. Since the acrylic resin is high in resistance to water and chemicals, the incorporation of the acrylic resin serves to increase the resistance to water and chemicals, that is, resistance to washing, of the entire resin layer. The acrylic resin component used here preferably contains an acrylic resin having a structure in which acrylate chains each having two or more carbon-carbon double bonds are crosslinked. Furthermore, it is preferable that the acrylic resin preferably has a crosslinked structure and that the crosslinked structure contains a structure as represented by either chemical formula (I) or (II) given below. Since such an acrylic resin has a three-dimensional crosslinked structure, it can work to improve the resistance to washing of the resin layer. In addition, if the acrylic resin has a crosslinked structure containing a structure as represented by either chemical formula (III) or (IV) that is formed through crosslinking of acrylate chains each having three or more carbon-carbon double bonds, it is more preferable because the crosslinking density of the acrylic resin is increased and the resistance to washing of the resin layer is further improved. From the viewpoint of maximizing the crosslinking density, it is particularly preferable to use an acrylic resin having a crosslinked structure containing a structure as represented by chemical formula (V) that is formed through crosslinking of acrylate chains each having six carbon-carbon double bonds.

[Chemical compound 3]

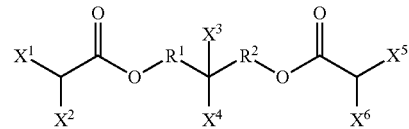

chemical formula (I)

($R^1$ and $R^2$ are each an alkyl chain having an appropriate length and $X^1$ to $X^6$ are each an appropriate atom or molecular structure.)

[Chemical compound 4]

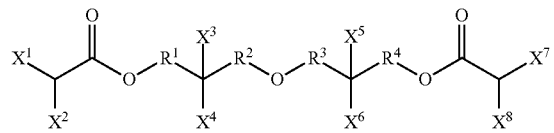

chemical formula (II)

($R^1$ to $R^4$ are each an alkyl chain having an appropriate length and $X^1$ to $X^8$ are each an appropriate atom or molecular structure.)

[Chemical compound 5]

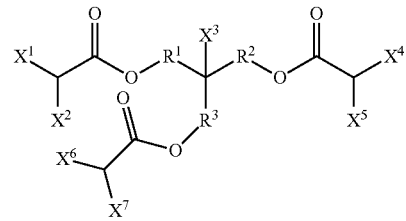

chemical formula (III)

($R^1$ to $R^3$ are each an alkyl chain having an appropriate length and $X^1$ to $X^7$ are each an appropriate atom or molecular structure.)

[Chemical compound 6]

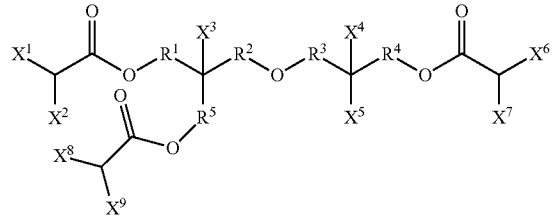

chemical formula (IV)

($R^1$ to $R^5$ are each an alkyl chain having an appropriate length and $X^1$ to $X^9$ are each an appropriate atom or molecular structure.)

[Chemical compound 7]

chemical formula (V)

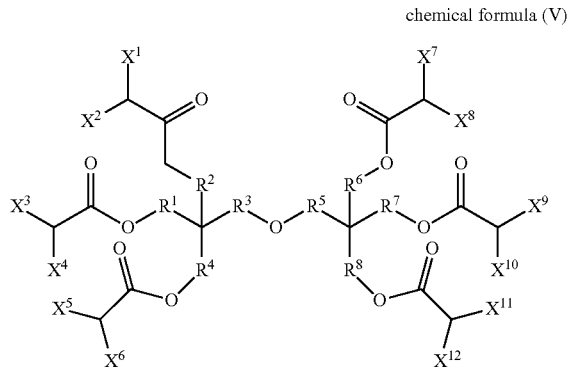

($R^1$ to $R^8$ are each an alkyl chain having an appropriate length and $X^1$ to $X^{12}$ are each an appropriate atom or molecular structure.)

Described are steps of a typical method for producing a sheet for heat exchange elements that includes a resin layer containing an acrylic resin. An acrylate having two or more carbon-carbon double bonds is mixed with the coating liquid for resin layer formation containing polyvinylpyrrolidone etc. and a urethane resin to prepare a coating liquid composition containing polyvinylpyrrolidone etc., a urethane resin, and an acrylate having two or more carbon-carbon double bonds. Then, the coating liquid composition is applied to a porous base material to form a coating film. If necessary, the porous base material having the coating film formed thereon is heated to evaporate the solvent, and then the coating film is exposed to ultraviolet rays to crosslink the acrylic resin etc. If a method for producing a sheet for heat exchange elements that has such steps, it will be possible to form, in the resin layer, a crosslinked structure of an acrylic resin as represented by the chemical formula (I) or (II) given above. Furthermore, it is considered that in the acrylate crosslinking step, crosslinking between the acrylate and polyvinylpyrrolidone and crosslinking between the acrylate and the urethane resin also occur in addition to crosslinking between acrylate chains, thereby permitting the production of a resin layer having further improved durability.

Examples of acrylates having two or more carbon-carbon double bonds include triethylene glycol diacrylate, trimethylolpropane triacrylate, pentaerythritol tetraacrylate, and dipentaerythritol hexaacrylate. In particular, it is preferable to use pentaerythritol tetraacrylate, which has four carbon-carbon double bonds, or dipentaerythritol hexaacrylate, which has six carbon-carbon double bonds, because they have larger numbers of carbon-carbon double bonds to ensure a higher crosslink density and permit the production of a resin layer having higher durability.

The content of the acrylic resin is preferably 2 mass % or more and 13 mass % or less relative to the weight of the entire resin layer. Since the effect of improving the durability increases as the content of the acrylic resin increases, the content is preferably 2 mass % or more. On the other hand, if the content of the acrylic resin is too large, the content of the polyvinylpyrrolidone etc. and urethane resin in the resin layer will be relatively small, and the moisture permeability and gas shielding property will deteriorate. Accordingly, the content of the acrylic resin is preferably 13 mass % or less.

[Heat Exchange Element]

A typical method for producing heat exchange elements is described below. A sheet for heat exchange elements and a corrugated sheet, which is used as a spacing member, are bonded together with an adhesive or the like to obtain a single-sided corrugated board. The use of a vinyl acetate based adhesive or an ethylene vinyl acetate based adhesive is preferable because the adhesive strength with the resin layer according to the present invention is improved. If necessary, the corrugated sheet may be treated with a flame retardant. The corrugation processing is performed by using a corrugator having a pair of gears that rotate while engaging with each other to produce a corrugated sheet, and the bonding of the sheet for heat exchange elements and the corrugated sheet is performed by an apparatus having a press roll that presses the sheet for heat exchange elements against the corrugated sheet. Another good procedure to bond the corrugated sheet and the sheet for heat exchange elements is applying an adhesive to the corrugation ridges of the corrugated sheet and then pressing the sheet for heat exchange elements against it to bond them together. Another good procedure is applying an adhesive to at least either the corrugated sheet or the sheet for heat exchange elements and press the corrugated sheet and the sheet for heat exchange elements while heating to bond them together. The sheet for heat exchange elements according to the present invention can also be used as the component of the corrugated sheet.

Such single-sided corrugated boards are stacked to produce a heat exchange element. More specifically, an adhesive is applied to the ridges of single-sided corrugated boards, and a plurality of such single-sided corrugations are stacked orthogonally to each other.

EXAMPLES

The present invention will now be illustrated in more detail with reference to examples, but it should be understood that the invention is not construed as being limited to these examples. The measuring methods used in these Examples are described below. When determining a numerical value from measurement, the measuring run was performed twice and the average of the measured values was adopted, unless otherwise specified.

<Measuring Method>

(1) Basis Weight of Sheet for Heat Exchange Elements

Five 100 mm×100 mm test pieces were prepared from a sheet for heat exchange elements and left to stand for 24 hours in an atmosphere at a temperature of 20° C. and a humidity of 65% RH, and then the mass (g) of each of the five test pieces was measured, followed by calculating the average, which was expressed in mass per square meter (g/m$^2$) and used as the basis weight (g/m$^2$) of the sheet for heat exchange elements.

(2) Basis Weight of the Porous Base Material

The five test pieces prepared in (1) were immersed for 2 minutes in 200 ml of a solvent (ethyl acetate) in a 300 ml container, and the front and back surfaces of the five test pieces were wiped five times. Then, the five specimens were immersed for another 2 minutes in 200 ml of a solvent (ethyl acetate) in a 300 ml container. Subsequently, the five test pieces were left to stand for 24 hours in an atmosphere at a temperature of 20° C. and a humidity of 65% RH to obtain test pieces of the porous base material prepared by removing the resin layer from the sheet for heat exchange elements. Thereafter, the mass (g) of each of the five test pieces was measured, and the average was expressed as mass per square meter (g/m$^2$) and used as the basis weight (g/m$^2$) of the porous base material.

(3) Basis Weight of the Resin Layer

Then, the basis weight (g/m$^2$) of the resin layer was calculated by the following equation from the basis weight of the sheet for heat exchange elements and the basis weight of the porous base material determined in (1) and (2).

> Basis weight (g/m$^2$) of the resin layer=basis weight (g/m$^2$) of the sheet for heat exchange elements− basis weight (g/m$^2$) of the porous base material (4) Identification and Contents of Components Contained in the Resin Layer A 5 g test piece of the sheet for heat exchange elements was examined by pyrolysis gas chromatography (pyrolysis GC-MS) to identify the components present in the resin layer and the contents of the components present in the resin layer were determined.

(5) Basis Weight of the Urethane Resin

From the content of each component contained in the resin layer determined in (4), the ratio of the content of the urethane resin contained in the resin layer to the total content of all components constituting the resin layer (content of the urethane resin/total content of all components of the resin layer) was calculated, and the basis weight of the resin layer determined in (3) was multiplied by the above ratio to give the basis weight of the urethane re sin.

(5) Thickness of Sheet for Heat Exchange Elements

Three 200 mm×200 mm test pieces were taken from different parts of a sample (sheet for heat exchange elements) and left to stand for 24 hours in an atmosphere at a temperature of 20° C. and a humidity of 65% RH, and then the thickness (μm) was measured at a total of five points, namely, the center and four corners, of each of the three test pieces using a measuring instrument (Model ID-112, manufactured by Mitsutoyo Co., Ltd.), followed by averaging the 15 measured values to represent the thickness of the sample.

(6) Moisture Permeability of the Sheet for Heat Exchange Elements

Moisture permeability was measured by the method according to JIS Z0208 (1976) Moisture Permeability (cup method). The cup used has a diameter of 60 mm and a depth of 25 mm. Five sheets for heat exchange elements were cut to prepare circular test pieces each having a diameter of 70 mm. The test pieces were left to stand for 24 hours at a temperature of 20° C. and a humidity of 65% RH. Then, a test piece was placed in a cup containing calcium chloride for moisture measurement (manufactured by Wako Pure Chemical Industries, Ltd.), and the initial combined weight ($T_0$) of the test piece, calcium chloride, and cup was measured. Subsequently, the test piece was placed in a constant-temperature, constant-humidity chamber set at a temperature of 20° C. and a humidity of 65% RH, and the combined weight of the test piece, calcium chloride, and cup was measured 1 hour, 2 hours, 3 hours, 4 hours, and 5 hours after the placement ($T_1$, $T_2$, $T_3$, $T_4$, and $T_5$, respectively). The moisture permeability was calculated by the following equation, and the average over the five test pieces was taken to represent their moisture permeability (g/m$^2$/hr).

> Moisture permeability (g/m$^2$/hr)={[(($T_0-T_1$)/$T_1$)+ (($T_0-T_2$)/$T_2$)+(($T_0-T_3$)/$T_3$)+(($T_0-T_4$)/$T_4$)+(($T_0-T_5$)/$T_5$)]/5}×100

(7) Air Permeability of the Sheet for Heat Exchange Elements

Air permeability was measured by the method according to JIS P8117 (1998) Air Permeability (Gurley tester method). Five test pieces (sheets for heat exchange elements) each having a length of 100 mm and a width of 100 mm were prepared. A test piece was left to stand for 24 hours at a temperature of 20° C. and a humidity of 65% RH and then left to stand at the same temperature and humidity in a Gurley type densometer (Model G-B3C, manufactured by Toyo Seiki Seisaku-sho, Ltd.) while determining the period of time required for 100 ml of air to pass, followed by calculating the average over the five test pieces to represent their air permeability (sec/100 ml). Note that the sheet for heat exchange elements improves in gas shielding property with an increasing air permeability.

(8) Carbon Dioxide Shielding Rate of the Sheet for Heat Exchange Elements

A test piece (25 cm×25 cm) of the sheet for heat exchange elements was attached to the opening (20 cm×20 cm) of a box having a width of 0.36 m, a length of 0.60 m, and a height of 0.36 m (0.078 m$^3$) so as to cover the opening, and carbon dioxide was injected into the box through the carbon dioxide inlet to adjust the carbon dioxide volume concentration in the box to 8,000 ppm. After 1 hour, the carbon dioxide concentration (ppm) in the box was measured and the carbon dioxide shielding ratio (%) was calculated by the following equation. The carbon dioxide concentration were evaluated using a measuring instrument (testo 535, manufactured by Testo SE & Co. KGaA).

> Carbon dioxide shielding rate (%)={(carbon dioxide concentration in the box after 1 hour−carbon dioxide concentration outside the box)/(initial carbon dioxide concentration in the box−carbon dioxide concentration outside the box)}×100

(9) Water Resistance of the Sheet for Heat Exchange Elements

Ten 100 mm×100 mm test pieces of the sheet for heat exchange elements were prepared and immersed in 700 ml of warm water at 40° C. in a container having a volume of 1 L, followed by stirring for 30 seconds and then collecting the test pieces. Subsequently, the same procedure of immersion in warm water and stirring was repeated two additional times. (Hereinafter, the above procedure will be referred to as warm water washing of a test piece.) The test pieces collected were dried for 3 minutes in a hot air oven set at 60° C. and then left to stand for 24 hours in an atmosphere at 20° C. and 65% RH.

Then, the test pieces were examined before and after the warm water washing by the procedures described in (4) and (5) to determine the moisture permeability and air permeability. The rate of change was calculated by the following equation from the measurements of air permeability and moisture permeability taken before and after the hot water washing.

> Rate of change (%)={(measurement taken after hot water washing−measurement taken before hot water washing)/measurement taken before hot water washing}×100

In the case where the sheet for heat exchange elements is low in water resistance, part of the polyvinylpyrrolidone etc. present in the resin layer flows out due to the hot water washing to cause a decrease in the hygroscopicity of the resin layer, and accordingly, the resulting sheet for heat exchange elements will be low in moisture permeability, resulting in a negative rate of change (%).

If a large part of the resin layer flows out due to the hot water washing, the resulting sheet for heat exchange elements will decrease in air permeability, resulting in a negative rate of change (%). If a decrease in air permeability occurs, a large volume of moisture will permeate the sheet for heat exchange elements and the moisture permeability will increase, resulting in a positive rate of change (%).

It can be said, therefore, that the sheet for heat exchange elements is high in water resistance when the absolute values of its rates of change (%) in both moisture permeability and air permeability are small.

(10) Shape Stability of the Sheet for Heat Exchange Elements

The shape stability was evaluated in terms of the rate of dimensional change that occurred in the dimensions of the porous base material after the formation of the resin layer. The porous base material was cut into a size of 150 mm (short side)×300 mm (long side), and a resin layer having a size of 150 mm (short side)×200 mm (long side) was formed on the surface of the porous base material to obtain a sample of the sheet for heat exchange elements. Here, details of the procedure for forming the resin layer were as described in the Examples and Comparative examples given below. Then, the width of the short side of the sample for heat exchange elements prepared above was measured, and the rate of dimensional change was calculated by the following equation.

Rate of dimensional change (%)=[{short side length (mm) of sample of sheet for heat exchange elements−150}/150]×100

Here, it can be said that a sheet for heat exchange elements is high in shape stability if the absolute value of its rate of dimensional change (%) is small.

(11) Resistance to Washing of the Sheet for Heat Exchange Elements

Ten 100 mm×100 mm test pieces of the sheet for heat exchange elements were prepared. Then, a household dish detergent was dissolved in warm water at 40° C. to prepare a washing liquid having a concentration of 0.01 mass %. A test piece was immersed in this washing liquid and left to stand for 5 minutes. The sample was then taken out and rinsed twice for 10 seconds each time with flowing water at 40° C. The treatment procedure from immersion in the washing liquid to rinsing was defined as one cycle of washing and each sample was subjected to five repeated cycles of washing. This five cycle washing process is referred to as washing resistance test. After the washing resistance test, the test piece was restored, dried for 3 minutes in a hot air oven set at 60° C., and then left to stand for 24 hours in an atmosphere at 20° C. and 65% RH.

The test piece was examined before and after the washing resistance test by the procedures described in (4) and (5) to determine the moisture permeability and air permeability. The rate of change was calculated by the following equation from the measurements of air permeability and moisture permeability taken before and after the washing resistance test.

Rate of change (%)={measurement taken after the washing resistance test−measurement taken before the washing resistance test)/measurement taken before the washing resistance test}×100

In the case where the sheet for heat exchange elements is low in washing resistance, part of the polyvinylpyrrolidone etc. present in the resin layer flows out during the washing resistance test to cause a decrease in the hygroscopicity of the resin layer, and accordingly, the resulting sheet for heat exchange elements will be low in moisture permeability, resulting in a negative rate of change (%).

If a large part of the resin layer flows out during the washing resistance test, the resulting sheet for heat exchange elements will decrease in air permeability, resulting in a negative rate of change (%). If a decrease in air permeability occurs, a large volume of moisture will permeate the sheet for heat exchange elements and the moisture permeability will increase, resulting in a positive rate of change (%).

It can be said, therefore, that the sheet for heat exchange elements is high in washing resistance when the absolute values of its rates of change (%) in both moisture permeability and air permeability are small.

Example 1

To represent the porous base material, a polyethylene porous film having a basis weight of 6.7 g/m$^2$, a thickness of 12 μm, a porosity of 43%, and a pore diameter of 33 nm was prepared. Examination of its physical properties showed that it had a moisture permeability of 101 g/m$^2$/hr and a carbon dioxide shielding ratio of 2%.

Then, a coating composition for resin layer formation was prepared by the following procedure.

Polyvinylpyrrolidone (Luvitec K 85 (registered trademark), manufactured by BASF) and a water dispersion of polyurethane resin (Superflex 150 (registered trademark), manufactured by DKS Co. Ltd., solid content 30 mass %) was prepared as material for the resin layer. A mixture of ethanol and water was used as solvent. Luvitec K 85, Superflex 150, ethanol, and water were mixed at a mass ratio of 3.6:1.3:62.7:32.4 and stirred until a uniform liquid was obtained to prepare a mixed solution having a solid content of 4 mass %. Furthermore, a UV initiator (Omnirad (registered trademark) 184, manufactured by IGM Resins B.V.) was added to the coating composition for resin layer formation so that it accounted for 3 mass % relative to Luvitec K 85.

Then, a resin layer was formed on the surface of the porous base material by the following procedure.

The coating composition for resin layer formation was applied to the surface of the porous base material using a #4 bar coater. After coating, drying was performed for 1 minute in a hot air oven set at 60° C. Then, the porous base material carrying a resin layer was attached to a base paper using a tape, and UV irradiation was performed at an irradiation dose of 500 mJ/cm$^2$ in an atmosphere using a UV irradiation device (ECS-301, manufactured by Eye Graphics Co., Ltd.) to crosslink the resin layer.

A sheet for heat exchange elements having a resin layer containing 90 mass % of polyvinylpyrrolidone was obtained by the above procedure.

The components of this sheet for heat exchange elements are shown in Table 1.

Example 2

A coating composition for resin layer formation was prepared by the following procedure.

Luvitec K 85, Superflex 150, ethanol, and water were mixed at a mass ratio of 3.2:2.7:65.3:28.8 and stirred until a uniform liquid was obtained to prepare a mixed solution having a solid content of 4 mass %.

Except for the above, the same procedure as in Example 1 was carried out to prepare a sheet for heat exchange elements having a resin layer containing 80 mass % of polyvinylpyrrolidone.

The components of this sheet for heat exchange elements are shown in Table 1.

Example 3

A coating composition for resin layer formation was prepared by the following procedure.

Luvitec K 85, Superflex 150, ethanol, and water were mixed at a mass ratio of 3.0:3.3:66.7:27.0 and stirred until a uniform liquid was obtained to prepare a mixed solution having a solid content of 4 mass %.

Except for the above, the same procedure as in Example 1 was carried out to prepare a sheet for heat exchange elements containing 75 mass % of polyvinylpyrrolidone in the resin layer.

The components of this sheet for heat exchange elements are shown in Table 1.

Example 4

A coating composition for resin layer formation was prepared by the following procedure.

Luvitec K 85, Superflex 150, ethanol, and water were mixed at a mass ratio of 2.8:4.0:68.0:25.2 and stirred until a uniform liquid was obtained to prepare a mixed solution having a solid content of 4 mass %.

Except for the above, the same procedure as in Example 1 was carried out to prepare a sheet for heat exchange elements containing 70 mass % of polyvinylpyrrolidone in the resin layer.

The components of this sheet for heat exchange elements are shown in Table 1.

Example 5

A coating composition for resin layer formation was prepared by the following procedure.

Luvitec K 85, Superflex 150, ethanol, and water were mixed at a mass ratio of 2.4:5.3:70.7:21.6 and stirred until a uniform liquid was obtained to prepare a mixed solution having a solid content of 4 mass %.

Except for the above, the same procedure as in Example 1 was carried out to prepare a sheet for heat exchange elements containing 60 mass % of polyvinylpyrrolidone in the resin layer.

The components of this sheet for heat exchange elements are shown in Table 1.

Example 6

A coating composition for resin layer formation was prepared by the following procedure.

Luvitec K 85, Superflex 150, ethanol, and water were mixed at a mass ratio of 2.0:6.7:73.3:18.0 and stirred until a uniform liquid was obtained to prepare a mixed solution having a solid content of 4 mass %.

Except for the above, the same procedure as in Example 1 was carried out to prepare a sheet for heat exchange elements containing 50 mass % of polyvinylpyrrolidone in the resin layer.

The components of this sheet for heat exchange elements are shown in Table 1.

Example 7

A coating composition for resin layer formation was prepared by the following procedure.

Luvitec K 85, Superflex 150, ethanol, and water were mixed at a mass ratio of 1.6:8.0:76.0:14.4 and stirred until a uniform liquid was obtained to prepare a mixed solution having a solid content of 4 mass %.

Except for the above, the same procedure as in Example 1 was carried out to prepare a sheet for heat exchange elements containing 40 mass % of polyvinylpyrrolidone in the resin layer.

The components of this sheet for heat exchange elements are shown in Table 1.

Example 8

A coating composition for resin layer formation was prepared by the following procedure.

Luvitec K 85, Superflex 150, ethanol, and water were mixed at a mass ratio of 1.0:10.0:80.0:9.0 and stirred until a uniform liquid was obtained to prepare a mixed solution having a solid content of 4 mass %.

Except for the above, the same procedure as in Example 1 was carried out to prepare a sheet for heat exchange elements containing 25 mass % of polyvinylpyrrolidone in the resin layer.

The components of this sheet for heat exchange elements are shown in Table 1.

Example 9

A coating composition for resin layer formation was prepared by the following procedure.

Luvitec K 85, Superflex 150, ethanol, and water were mixed at a mass ratio of 2.3:2.5:75.0:20.3 and stirred until a uniform liquid was obtained to prepare a mixed solution having a solid content of 3 mass %.

A #3 bar coater was used to apply the coating composition.

Except for the above, the same procedure as in Example 1 was carried out to prepare a sheet for heat exchange elements containing 75 mass % of polyvinylpyrrolidone in the resin layer.

The components of this sheet for heat exchange elements are shown in Table 1.

Example 10

A #10 bar coater was used to apply the coating composition.

Except for the above, the same procedure as in Example 3 was carried out to prepare a sheet for heat exchange elements containing 75 mass % of polyvinylpyrrolidone in the resin layer.

The components of this sheet for heat exchange elements are shown in Table 1.

Example 11

Except for omitting the UV irradiation step so that the resin layer would not be crosslinked, the same procedure as in Example 3 was carried out to prepare a sheet for heat exchange elements having a resin layer containing 75 mass % of polyvinylpyrrolidone.

The components of this sheet for heat exchange elements are shown in Table 1.

Example 12

To represent the porous base material, a polyethylene porous film having a basis weight of 5.6 g/m$^2$, a thickness of 10 μm, a porosity of 43%, and a pore diameter of 33 nm was prepared. Examination of its physical properties showed that it had a moisture permeability of 101 g/m²/hr and a carbon dioxide shielding ratio of 2%. Except for using the above porous base material, the same procedure as in Example 9 was carried out to prepare a sheet for heat exchange elements having a resin layer containing 75 mass % of polyvinylpyrrolidone.

The components of this sheet for heat exchange elements are shown in Table 1.

Example 13

Using the same porous base material as in Example 12, the same procedure as in Example 3 was carried out to prepare a sheet for heat exchange elements having a resin layer containing 75 mass % of polyvinylpyrrolidone.

The components of this sheet for heat exchange elements are shown in Table 1.

Example 14

On the same porous base material as in Example 12, the same coating composition as in Example 3 was applied using a #3 bar coater. Except that the UV irradiation dose was 200 mJ/cm², the same procedure as in Example 1 was carried out to prepare a sheet for heat exchange elements having a resin layer containing 75 mass % of polyvinylpyrrolidone. The components of this sheet for heat exchange elements are shown in Table 3.

Example 15

Except for using a #4 bar coater, the same procedure as in Example 14 was carried out to prepare a sheet for heat exchange elements having a resin layer containing 75 mass % of polyvinylpyrrolidone. The components of this sheet for heat exchange elements are shown in Table 3.

Example 16

A coating composition for resin layer formation was prepared by the following procedure.

Luvitec K 85 and Superflex 150 were prepared as materials for the resin layer, and an acrylate product containing dipentaerythritol hexaacrylate as main component (Light Acrylate DPE-6A (registered trademark), manufactured by Kyoeisha Chemical Co., Ltd.) was prepared as acrylic resin material. A mixture of ethanol and water was used as solvent. Luvitec K 85, Superflex 150, Light Acrylate DPE-6A, ethanol, and water were mixed at a mass ratio of 3.0:2.7:0.2:67.1:27.0 and stirred until a uniform liquid was obtained to prepare a mixed solution having a solid content of 4 mass %. Furthermore, Omnirad 184 was added to the coating composition for resin layer formation so that it accounted for 3 mass % relative to Luvitec K 85.

Except for using the above coating composition, the same procedure as in Example 14 was carried out to prepare a sheet for heat exchange elements having a resin layer containing 75 mass % of polyvinylpyrrolidone and 5 mass % of acrylic resin. The components of this sheet for heat exchange elements are shown in Table 3.

Example 17

Except for using a #4 bar coater, the same procedure as in Example 16 was carried out to prepare a sheet for heat exchange elements having a resin layer containing 75 mass % of polyvinylpyrrolidone and 5 mass % of acrylic resin. The components of this sheet for heat exchange elements are shown in Table 3.

Example 18

Except that the mixing ratio among Luvitec K 85, Superflex 150, Light Acrylate DPE-6A, ethanol, and water in the coating composition was 3.0:2.0:0.4:67.6:27.0 by mass, the same procedure as in Example 17 was carried out to prepare a sheet for heat exchange elements having a resin layer containing 75 mass % of polyvinylpyrrolidone and 10 mass % of acrylic resin. The components of this sheet for heat exchange elements are shown in Table 3.

Example 19

Except for using an acrylate product containing pentaerythritol tetraacrylate as main component (Light Acrylate PE-4A (registered trademark), manufactured by Kyoeisha Chemical Co., Ltd.) as acrylic resin material, the same procedure as in Example 17 was carried out to prepare a sheet for heat exchange elements having a resin layer containing 75 mass % of polyvinylpyrrolidone and 5 mass % of acrylic resin. The components of this sheet for heat exchange elements are shown in Table 3.

Example 20

Except for using an acrylate product containing pentaerythritol tetraacrylate as main component (Light Acrylate PE-4A (registered trademark), manufactured by Kyoeisha Chemical Co., Ltd.) as acrylic resin material, the same procedure as in Example 17 was carried out to prepare a sheet for heat exchange elements having a resin layer containing 75 mass % of polyvinylpyrrolidone and 5 mass % of acrylic resin. The components of this sheet for heat exchange elements are shown in Table 3.

Example 21

A coating composition for resin layer formation was prepared by the following procedure.

Luvitec K 85, Superflex 150, ethanol, and water were mixed at a mass ratio of 3.4:2.0:64.0:30.6 and stirred until a uniform liquid was obtained to prepare a mixed solution having a solid content of 4 mass %.

Except for the above, the same procedure as in Example 1 was carried out to prepare a sheet for heat exchange elements having a resin layer containing 85 mass % of polyvinylpyrrolidone.

The components of this sheet for heat exchange elements are shown in Table 1.

Comparative Example 1

A coating composition for resin layer formation was prepared by the following procedure.

Luvitec K 85, ethanol, and water were mixed at a mass ratio of 10.0:50.0:40.0 and stirred until a uniform liquid was obtained to prepare a mixed solution having a solid content of 10 mass %.

A #6 bar coater was used to apply the coating composition.

Except for the above, the same procedure as in Example 1 was carried out to prepare a sheet for heat exchange elements having a resin layer containing 100 mass % of polyvinylpyrrolidone.

The components of this sheet for heat exchange elements are shown in Table 1.

Comparative Example 2

Except for omitting the UV irradiation step so that the resin layer would not be crosslinked, the same procedure as in Comparative example 1 was carried out to prepare a sheet for heat exchange elements having a resin layer containing 100 mass % of polyvinylpyrrolidone.

The components of this sheet for heat exchange elements are shown in Table 1.

Comparative Example 3

A coating composition for resin layer formation was prepared by the following procedure.

Luvitec K 85, ethanol, and water were mixed at a mass ratio of 4.0:60.0:36.0 and stirred until a uniform liquid was obtained to prepare a mixed solution having a solid content of 4 mass %.

Except for the above, the same procedure as in Example 1 was carried out to prepare a sheet for heat exchange elements having a resin layer containing 100 mass % of polyvinylpyrrolidone.

The components of this sheet for heat exchange elements are shown in Table 1.

Comparative Example 4

A coating composition for resin layer formation was prepared by the following procedure.

Superflex 150, ethanol, and water were mixed at a mass ratio of 13.3:30.0:56.7 and stirred until a uniform liquid was obtained to prepare a mixed solution having a solid content of 4 mass %.

Except for the above, the same procedure as in Example 1 was carried out to prepare a sheet for heat exchange elements having a resin layer containing 100 mass % of urethane resin.

The components of this sheet for heat exchange elements are shown in Table 1.

Evaluation results of each sheet for heat exchange elements are shown in Table 2.

The sheets for heat exchange elements produced in Examples 1 to 13 and 21 had high moisture permeability because polyvinylpyrrolidone was contained in the resin layers. In addition, they had high air permeability and good gas shielding property because they contained a urethane resin. These sheets for heat exchange elements also have high water resistance.

Since the sheet for heat exchange elements produced in Comparative Example 1 does not contain a urethane resin in the resin layer, it does not develop sufficiently good gas shielding property (that is, low in air permeability) unless the basis weight of the resin layer is increased. Furthermore, because of a large basis weight of the resin layer, significant curing and shrinkage occur when the resin layer is crosslinked, and the shape stability of this sheet for heat exchange elements is extremely inferior, making this sheet for heat exchange elements difficult to handle. In the case of the sheet for heat exchange elements produced in Comparative example 2, in which the resin layer was not crosslinked, the resin layer was detached from the sheet for heat exchange elements during the warm water washing step, and the resin layer was unable to block the pores of the porous base material, resulting in a very large deterioration in the gas shielding property of the sheet for heat exchange elements after the warm water washing step. In the case of the sheet for heat exchange elements produced in Comparative example 3, the basis weight of the resin layer is nearly equal to that of the resin layers produced in Examples 1 to 8, but sufficiently good gas shielding property did not develop (that is, low in air permeability) because of the absence of urethane resin. From the evaluation results of the sheets for heat exchange elements produced in Comparative Examples 1 to 3, it can be seen that it is difficult to achieve both good gas shielding property and high water resistance when the resin layer contains polyvinylpyrrolidone alone.

In the case of the sheet for heat exchange elements produced in Comparative example 4, the resin layer did not contain polyvinylpyrrolidone and failed to develop a sufficiently high moisture permeability.

Evaluation results of the sheets for heat exchange elements produced in Examples 14 to 20 are shown in Table 4.

Comparison between the sheets for heat exchange elements produced in Examples 14 and 15 and the sheets for heat exchange elements produced in Examples 16 and 17 shows that the sheets for heat exchange elements produced in Examples 16 and 17, in which the resin layers contained an acrylic resin, were found to suffer from little change in moisture permeability and air permeability after the washing resistance test. This indicates that the acrylic resin having a crosslinked structure in the resin layer serves to improve the washing resistance of the resin layer and prevent the resin layer from being detached during the washing test. Compared with the sheet for heat exchange elements produced in Example 17, the sheet for heat exchange elements produced in Example 18 has a larger acrylic resin content and a smaller urethane resin content. This sheet for heat exchange elements produced in Example 18 is small air permeability. This indicates that the urethane resin contributes to the improvement in the gas shielding property.

Furthermore, the sheet for heat exchange elements produced in Example 17 contains an acrylic resin in which acrylate chains having six carbon-carbon double bonds are crosslinked, whereas the sheet for heat exchange elements produced in Example 19 and the sheet for heat exchange elements produced in Example 20 contain an acrylic resin in which acrylate chains respectively having four and two carbon-carbon double bonds are crosslinked. Comparison among the sheets for heat exchange elements produced in Examples 17, 19, and 20 shows that the washing resistance increases with an increasing number of carbon-carbon double bonds contained in the crosslinked acrylate chains present in the acrylic resin.

TABLE 1

| | Resin layer | | | | | | Sheet for heat exchange elements | |
|---|---|---|---|---|---|---|---|---|
| | type of polyvinylpyrrolidone etc. | type of urethane resin | Content of PVP etc. mass % | basis weight of resin layer g/m² | basis weight of urethane resin g/m² | existence of crosslinked structure in PVP etc. | content of PVP etc. (mass %)/ content of urethane resin (mass %) | basis weight of porous base material g/m² | basis weight of resin layer/ basis weight of porous base material |
| Example 1 | polyvinylpyrrolidone | polyurethane | 90 | 0.5 | 0.05 | yes | 9.0 | 6.7 | 0.08 |
| Example 2 | polyvinylpyrrolidone | polyurethane | 80 | 0.5 | 0.10 | yes | 4.0 | 6.7 | 0.08 |
| Example 3 | polyvinylpyrrolidone | polyurethane | 75 | 0.5 | 0.13 | yes | 3.0 | 6.7 | 0.08 |
| Example 4 | polyvinylpyrrolidone | polyurethane | 70 | 0.5 | 0.15 | yes | 2.3 | 6.7 | 0.08 |
| Example 5 | polyvinylpyrrolidone | polyurethane | 60 | 0.5 | 0.20 | yes | 1.5 | 6.7 | 0.08 |
| Example 6 | polyvinylpyrrolidone | polyurethane | 50 | 0.5 | 0.25 | yes | 1.0 | 6.7 | 0.08 |
| Example 7 | polyvinylpyrrolidone | polyurethane | 40 | 0.5 | 0.30 | yes | 0.7 | 6.7 | 0.08 |
| Example 8 | polyvinylpyrrolidone | polyurethane | 25 | 0.5 | 0.38 | yes | 0.3 | 6.7 | 0.08 |
| Example 9 | polyvinylpyrrolidone | polyurethane | 75 | 0.3 | 0.08 | yes | 3.0 | 6.7 | 0.05 |
| Example 10 | polyvinylpyrrolidone | polyurethane | 75 | 0.9 | 0.23 | yes | 3.0 | 6.7 | 0.13 |
| Example 11 | polyvinylpyrrolidone | polyurethane | 75 | 0.5 | 0.13 | no | 3.0 | 6.7 | 0.08 |
| Example 12 | polyvinylpyrrolidone | polyurethane | 75 | 0.3 | 0.08 | yes | 3.0 | 5.6 | 0.05 |
| Example 13 | polyvinylpyrrolidone | polyurethane | 75 | 0.5 | 0.13 | yes | 3.0 | 5.6 | 0.09 |
| Example 21 | polyvinylpyrrolidone | polyurethane | 85 | 0.5 | 0.08 | yes | 5.7 | 6.7 | 0.08 |
| Comparative example 1 | polyvinylpyrrolidone | — | 100 | 1.2 | 0.00 | yes | — | 6.7 | 0.18 |
| Comparative example 2 | polyvinylpyrrolidone | — | 100 | 1.2 | 0.00 | no | — | 6.7 | 0.18 |
| Comparative example 3 | polyvinylpyrrolidone | — | 100 | 0.5 | 0.00 | yes | — | 6.7 | 0.08 |
| Comparative example 4 | — | polyurethane | 0 | 0.5 | 0.5 | no | — | 6.7 | 0.075 |

TABLE 2

| | Performance of sheet for heat exchange elements | | | | | | | |
|---|---|---|---|---|---|---|---|---|
| | before warm water washing | | | after warm water washing | | water resistance | | shape stability rate of dimensional change between before and after resin layer formation % |
| | moisture permeability g/m²/hr | air permeability S/100 ml | carbon dioxide shielding rate % | moisture permeability g/m²/hr | air permeability S/100 ml | rate of change in moisture permeability % | rate of change in air permeability % | |
| Example 1 | 87 | 1410 | 100 | 88 | 1390 | 1.1 | −1.4 | −2.9 |
| Example 2 | 82 | >40000 | 100 | 82 | >40000 | 0.0 | 0.0 | −2.8 |
| Example 3 | 77 | >40000 | 100 | 79 | >40000 | 2.6 | 0.0 | −2.8 |
| Example 4 | 69 | >40000 | 100 | 71 | >40000 | 2.9 | 0.0 | −2.8 |
| Example 5 | 55 | >40000 | 100 | 55 | >40000 | 0.0 | 0.0 | −2.5 |
| Example 6 | 42 | >40000 | 100 | 43 | >40000 | 2.4 | 0.0 | −2.3 |
| Example 7 | 37 | >40000 | 100 | 36 | >40000 | −2.7 | 0.0 | −2.0 |
| Example 8 | 35 | >40000 | 100 | 35 | >40000 | 0.0 | 0.0 | −1.5 |
| Example 9 | 80 | 6500 | 100 | 81 | 6400 | 1.3 | −1.5 | −2.1 |
| Example 10 | 76 | >40000 | 100 | 78 | >40000 | 2.6 | 0.0 | −3.7 |
| Example 11 | 77 | >40000 | 100 | 71 | >40000 | −7.8 | 0.0 | −1.2 |
| Example 12 | 79 | 24000 | 100 | 80 | 24000 | 1.3 | 0.0 | −2.8 |
| Example 13 | 78 | >40000 | 100 | 80 | >40000 | 2.6 | 0.0 | −4.2 |
| Example 21 | 85 | 29000 | 100 | 86 | 29000 | 1.2 | 0.0 | −2.8 |
| Comparative example 1 | not measurable due to low shape stability | not measurable due to low shape stability | not measurable due to low shape stability | not measurable due to low shape stability | not measurable due to low shape stability | not measurable due to low shape stability | not measurable due to low shape stability | −50.0 |
| Comparative example 2 | 85 | >40000 | 100 | 88 | 820 | 3.5 | −98.0 | −1.2 |
| Comparative example 3 | 85 | 400 | 4 | 85 | 400 | 0.0 | 0.0 | −7.5 |
| Comparative example 4 | 27 | >40000 | 100 | 28 | >40000 | 3.7 | 0.0 | −1.1 |

TABLE 3

| | Resin layer | | | | | | | | | Sheet for heat exchange elements | |
|---|---|---|---|---|---|---|---|---|---|---|---|
| | type of polyvinylpyrrolidone etc. | type of urethane resin | type of acrylic resin | content of PVP etc. mass % | content of acrylic resin mass % | basis weight of resin layer g/m$^2$ | basis weight of urethane resin g/m$^2$ | existence of cross-linked structure in PVP etc. | content of PVP etc. (mass %)/ content of urethane resin (mass %) | basis weight of porous base material g/m$^2$ | basis weight of resin layer/basis weight of porous base material |
| Example 14 | polyvinylpyrrolidone | polyurethane | not used | 75 | — | 0.2 | 0.05 | yes | 3.0 | 5.6 | 0.04 |
| Example 15 | polyvinylpyrrolidone | polyurethane | not used | 75 | — | 0.5 | 0.13 | yes | 3.0 | 5.6 | 0.09 |
| Example 16 | polyvinylpyrrolidone | polyurethane | dipentaerythritol hexaacrylate | 75 | 5 | 0.2 | 0.04 | yes | 3.8 | 5.6 | 0.04 |
| Example 17 | polyvinylpyrrolidone | polyurethane | dipentaerythritol hexaacrylate | 75 | 5 | 0.5 | 0.10 | yes | 3.8 | 5.6 | 0.09 |
| Example 18 | polyvinylpyrrolidone | polyurethane | dipentaerythritol hexaacrylate | 75 | 10 | 0.5 | 0.08 | yes | 5.0 | 5.6 | 0.09 |
| Example 19 | polyvinylpyrrolidone | polyurethane | pentaerythritol tetraacrylate | 75 | 5 | 0.5 | 0.10 | yes | 3.8 | 5.6 | 0.09 |
| Example 20 | polyvinylpyrrolidone | polyurethane | triethylene glycol diacrylate | 75 | 5 | 0.5 | 0.10 | yes | 3.8 | 5.6 | 0.09 |

TABLE 4

| | Performance of sheet for heat exchange elements | | | | | | | |
|---|---|---|---|---|---|---|---|---|
| | before washing resistance test | | | after washing resistance test | | washing durability | | shape stability rate of dimensional change between before and after resin layer formation % |
| | moisture permeability g/m$^2$/hr | air permeability S/100 ml | carbon dioxide shielding rate % | moisture permeability g/m$^2$/hr | air permeability S/100 ml | rate of change in moisture permeability % | rate of change in air permeability % | |
| Example 14 | 84 | 2700 | 100 | 86 | 1500 | 2.4 | −44.4 | −2.8 |
| Example 15 | 78 | >40000 | 100 | 82 | 29000 | 5.1 | <−27.5 | −4.2 |
| Example 16 | 86 | 1700 | 100 | 86 | 1600 | 0.0 | −5.9 | −2.8 |
| Example 17 | 80 | >40000 | 100 | 80 | >40000 | 0.0 | 0.0 | −4.2 |
| Example 18 | 83 | 3700 | 100 | 83 | 3600 | 0.0 | −2.7 | −4.3 |
| Example 19 | 80 | >40000 | 100 | 80 | >40000 | 0.0 | 0.0 | −4.1 |
| Example 20 | 80 | >40000 | 100 | 82 | 35000 | 2.5 | <−12.5 | −4.0 |

EXPLANATION OF NUMERALS

101. Sheet for heat exchange elements
102. Porous base material
103. Resin layer
104. Pore
201. Pore filled by part of the resin layer

The invention claimed is:
1. A sheet for heat exchange elements comprising at least a laminate of a porous base material and a resin layer, the resin layer containing at least polyvinylpyrrolidone and/or a vinylpyrrolidone copolymer and a urethane resin, wherein the resin layer contains an acrylic resin and a content of the acrylic resin is 2 mass % or more and 13 mass % or less relative to 100 mass % of the entire resin layer, wherein a content of the polyvinylpyrrolidone and/or vinylpyrrolidone copolymer is 50% by mass or more and 95% by mass or less relative to 100% by mass of the entire resin layer, and wherein a content ratio between the polyvinylpyrrolidone and/or vinylpyrrolidone copolymer, and the urethane resin (content (mass %) of the polyvinylpyrrolidone and/or vinylpyrrolidone copolymer/content (mass %) of the urethane resin) is 1.0 or more and 9.0 or less, wherein the acrylic resin has a crosslinked structure comprising a structure as represented by either chemical formula (I) or (II) given below:

[Chemical compound 1]

chemical formula (I)

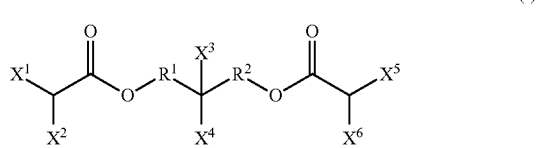

wherein $R^1$ and $R^2$ are each an alkyl chain having a length in the range of C1 and C5 and $X^1$ to $X^6$ are each an appropriate atom or molecular structure, and

[Chemical compound 2]

chemical formula (II)

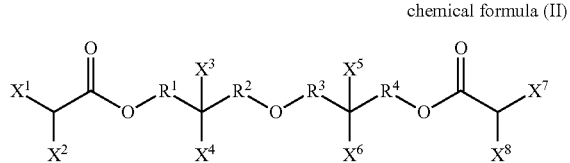

wherein $R^1$ to $R^4$ are each an alkyl chain having a length in the range of C1 and C5 and $X^1$ to $X^8$ are each an appropriate atom or molecular structure.

2. A sheet for heat exchange elements as set forth in claim 1, wherein the content of the polyvinylpyrrolidone and/or vinylpyrrolidone copolymer is 50% by mass or more and 85% by mass or less relative to 100% by mass of the entire resin layer, and wherein the content ratio between the polyvinylpyrrolidone and/or vinylpyrrolidone copolymer and the urethane resin (content (mass %) of the polyvinylpyrrolidone and/or vinylpyrrolidone copolymer/content (mass %) of the urethane resin) is 2.0 or more and 6.0 or less.

3. A sheet for heat exchange elements as set forth in claim 1, wherein the polyvinylpyrrolidone and/or vinylpyrrolidone copolymer has a crosslinked structure.

4. A sheet for heat exchange elements as set forth in claim 1, wherein a basis weight of the resin layer is 0.1 g/$m^2$ or more and a ratio of the basis weight of the resin layer to the basis weight of the porous base material (basis weight of the resin layer/basis weight of the porous base material) is 0.18 or less.

5. A heat exchange element comprising the sheet for heat exchange elements as set forth in claim 1.

6. A heat exchanger comprising the heat exchange element as set for in claim 5.

7. A method for producing a sheet for heat exchange elements as set forth in claim 1 comprising the step in which a coating liquid composition containing a polyvinylpyrrolidone and/or vinylpyrrolidone copolymer, a urethane resin, and an acrylic resin having a structure in which acrylate chains have two or more cross-linkable carbon-carbon double bonds is applied on the porous base material to form a coating film, followed by exposing the coating film to ultraviolet ray.

\* \* \* \* \*

UNITED STATES PATENT AND TRADEMARK OFFICE
CERTIFICATE OF CORRECTION

| | |
|---|---|
| PATENT NO. | : 11,761,718 B2 |
| APPLICATION NO. | : 16/769069 |
| DATED | : September 19, 2023 |
| INVENTOR(S) | : Kazuya Nishioka |

It is certified that error appears in the above-identified patent and that said Letters Patent is hereby corrected as shown below:

In the Claims

In Claim 4, Column 34, Line 11 "g/$^m$2" should read -- g/m$^2$ --

Signed and Sealed this
Fourteenth Day of November, 2023

Katherine Kelly Vidal
*Director of the United States Patent and Trademark Office*